(12) United States Patent
Tarighat Mehrabani

(10) Patent No.: US 11,444,658 B2
(45) Date of Patent: Sep. 13, 2022

(54) EDGE COMMUNICATION SYSTEM WITH CASCADED REPEATER DEVICES OVER WIRED MEDIUM

(71) Applicant: AR & NS Investment, LLC, Newport Coast, CA (US)

(72) Inventor: Alireza Tarighat Mehrabani, Los Angeles, CA (US)

(73) Assignee: AR & NS Investment, LLC, Pelican Vista, CA (US)

( * ) Notice: Subject to any disclaimer, the term of this patent is extended or adjusted under 35 U.S.C. 154(b) by 0 days.

(21) Appl. No.: 17/114,437

(22) Filed: Dec. 7, 2020

(65) Prior Publication Data

US 2021/0175925 A1 Jun. 10, 2021

Related U.S. Application Data

(60) Provisional application No. 62/946,074, filed on Dec. 10, 2019.

(51) Int. Cl.
*H04B 3/36* (2006.01)

(52) U.S. Cl.
CPC ..................... *H04B 3/36* (2013.01)

(58) Field of Classification Search
CPC .......... H04B 10/25753; H04B 10/2575; H04B 1/18; H04B 3/52; H04B 7/2606; H04B 3/36; H04W 88/085; H04W 88/10
See application file for complete search history.

(56) References Cited

U.S. PATENT DOCUMENTS

| 8,346,091 B2* | 1/2013 | Kummetz ............. H04W 16/14 398/115 |
| 9,661,470 B1 | 5/2017 | Bois et al. |
| 2013/0290911 A1 | 10/2013 | Praphul et al. |

(Continued)

FOREIGN PATENT DOCUMENTS

WO 2020166253 A1 8/2020

OTHER PUBLICATIONS

Non-Final Office Action for U.S. Appl. No. 16/910,291 dated Aug. 16, 2021.

(Continued)

*Primary Examiner* — David S Huang
(74) *Attorney, Agent, or Firm* — Chip Law Group

(57) ABSTRACT

A communication system that includes a first communication device at a first location. The first communication device obtains a plurality of radio frequency (RF) signals corresponding to different communication protocols from a plurality of communication systems. A plurality of repeater devices is arranged at a plurality of different locations and are communicatively coupled in a cascaded structure over wired mediums. At least one repeater device of the plurality of repeater devices is arranged at a second location and is configured to obtain a RF signal of a specified frequency through a wired medium from the first communication device. The at least one repeater device further distributes, from the obtained RF signal of the specified frequency, the plurality of radio frequency (RF) signals corresponding to different communication protocols wirelessly to a plurality of end-user devices or one or more communication systems of the plurality of communication systems.

23 Claims, 9 Drawing Sheets

(56) References Cited

U.S. PATENT DOCUMENTS

| | | | |
|---|---|---|---|
| 2015/0077336 A1 | 3/2015 | Elangovan | |
| 2017/0018831 A1* | 1/2017 | Henry | H01P 5/087 |
| 2018/0115080 A1* | 4/2018 | Hussain | H01Q 21/00 |
| 2019/0280759 A1 | 9/2019 | Bennett et al. | |
| 2019/0313386 A1 | 10/2019 | Hwang et al. | |
| 2020/0052950 A1 | 2/2020 | Manolakos et al. | |
| 2020/0091608 A1 | 3/2020 | Alpman et al. | |
| 2020/0350980 A1 | 11/2020 | Rofougaran et al. | |
| 2020/0366363 A1 | 11/2020 | Li et al. | |
| 2021/0373919 A1 | 12/2021 | Davenport et al. | |
| 2022/0089179 A1 | 3/2022 | Sakamoto et al. | |

OTHER PUBLICATIONS

Notice of Allowance for U.S. Appl. No. 16/911,036 dated May 25, 2021.

Supplemental Notice of Allowance for U.S. Appl. No. 16/911,036 dated Aug. 19, 2021.

Corrected Notice of Allowance for U.S. Appl. No. 16/911,036 dated Sep. 15, 2021.

Notice of Allowance for U.S. Appl. No. 16/910,413 dated Sep. 22, 2021.

Corrected Notice of Allowance for U.S. Appl. No. 16/910,413 dated Feb. 23, 2022.

Final Office Action for U.S. Appl. No. 16/910,291 dated Jan. 24, 2022.

Non-Final Office Action for U.S. Appl. No. 16/910,537 dated May 25, 2022.

* cited by examiner

EDGE COMMUNICATION SYSTEM WITH CASCADED REPEATER DEVICES OVER WIRED MEDIUM

REFERENCE

This Application makes reference to, claims priority to, and claims benefit from U.S. Provisional Application Ser. No. 62/946,074, which was filed on Dec. 10, 2019.

The above referenced Application is hereby incorporated herein by reference in its entirety.

FIELD OF TECHNOLOGY

Certain embodiments of the disclosure relate to a communication system. More specifically, certain embodiments of the disclosure relate to an edge communication system with cascaded repeater devices over wired medium.

BACKGROUND

Conventional communication devices, such as a wireless access point (WAP), are often used to extend the wireless coverage of an existing Wi-Fi signal to access Internet and to increase the numbers of end devices (users) that are capable to use Wi-Fi may connect to the WAP. However, Wi-Fi signals by virtue of the limitation of the Wi-Fi communication protocol have a defined range beyond which the connectivity is lost. Thus, a large number of WAPs or range extenders are used if wireless coverage for Wi-Fi signals are to be extended. Moreover, under ideal conditions, typically 2.4 GHz Wi-Fi supports up to 450 Mbps or 600 Mbps, and 5 GHz Wi-Fi supports up to 1300 Mbps. Thus, the data transmission over such narrow bandwidth is much lower as compared to higher radio frequencies. In case of Bluetooth network, the coverage and data transmission rate are even much less than conventional Wi-Fi network. Currently, certain communication devices, such as Internet-of-Things (IoT) devices depend on high-speed Internet access to the cloud to send sensor data and receive instructions (e.g. artificial intelligence-based processing models) from cloud either directly or via a gateway device. The number of wireless sensors and IoT devices are rapidly increasing with the increase in smart homes, smart offices, enterprises, etc. Existing communication systems and Wi-Fi standards are unbale to handle such massive number of wireless sensors and IoT devices and their quality-of-service (QoS) requirements. Further, some of the communication devices may not support cellular communication or Wi-Fi or may support some other communication protocols (e.g. Bluetooth low energy protocol only). In such cases, it is extremely difficult and technically challenging to support these end user devices having different communication capabilities and connectivity needs. Moreover, latency and signal noise are other technical problem with existing communication systems and network architecture when operating in a sub 6 GHz frequency, and such latency increases when more wireless access points or relay nodes are introduced in the network to extend the communication range.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

An edge communication system with cascaded repeater devices over wired medium, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in an edge communication system with cascaded repeater devices over wired medium. The edge communication system and method of the present disclosure not only improves data transfer rates between at least two communication devices as compared to existing wireless systems (e.g. conventional wireless local area networks), but also enables almost near zero latency communication and an always-connected experience. The edge communication system is capable of handling different wired and wireless communication protocols concurrently in terms of extending their range (i.e. a multiprotocol range extension at the same time) as well as increasing bandwidth while reducing (or even removing) signal noise and achieving almost near zero latency for high-performance content communication.

In an implementation, the cascaded repeater devices of the disclosed edge communication system receive mmWave radio frequency (RF) signal at a specified frequency f1 (e.g. 60 GHz) over wired medium, and execute multiple input multiple output (MIMO) communication at sub 6 gigahertz (GHz) frequency (i.e. frequency f2) that is less than the frequency of the mmWave RF signal, with one or more end-user devices. This mode of operation is beneficial and advantageous, given that the propagation at lower frequency (sub 6 GHz) results in rich scattering channel response, which leads to better MIMO capacity and MIMO performance, whereas receipt of mmWave RF signal over wired medium results in near zero latency and avoid unwanted effects, such as signal interference, of wireless mmWave signal propagation. In the following description, reference is made to the accompanying drawings, which form a part hereof, and in which is shown, by way of illustration, various embodiments of the present disclosure.

Figure 1:
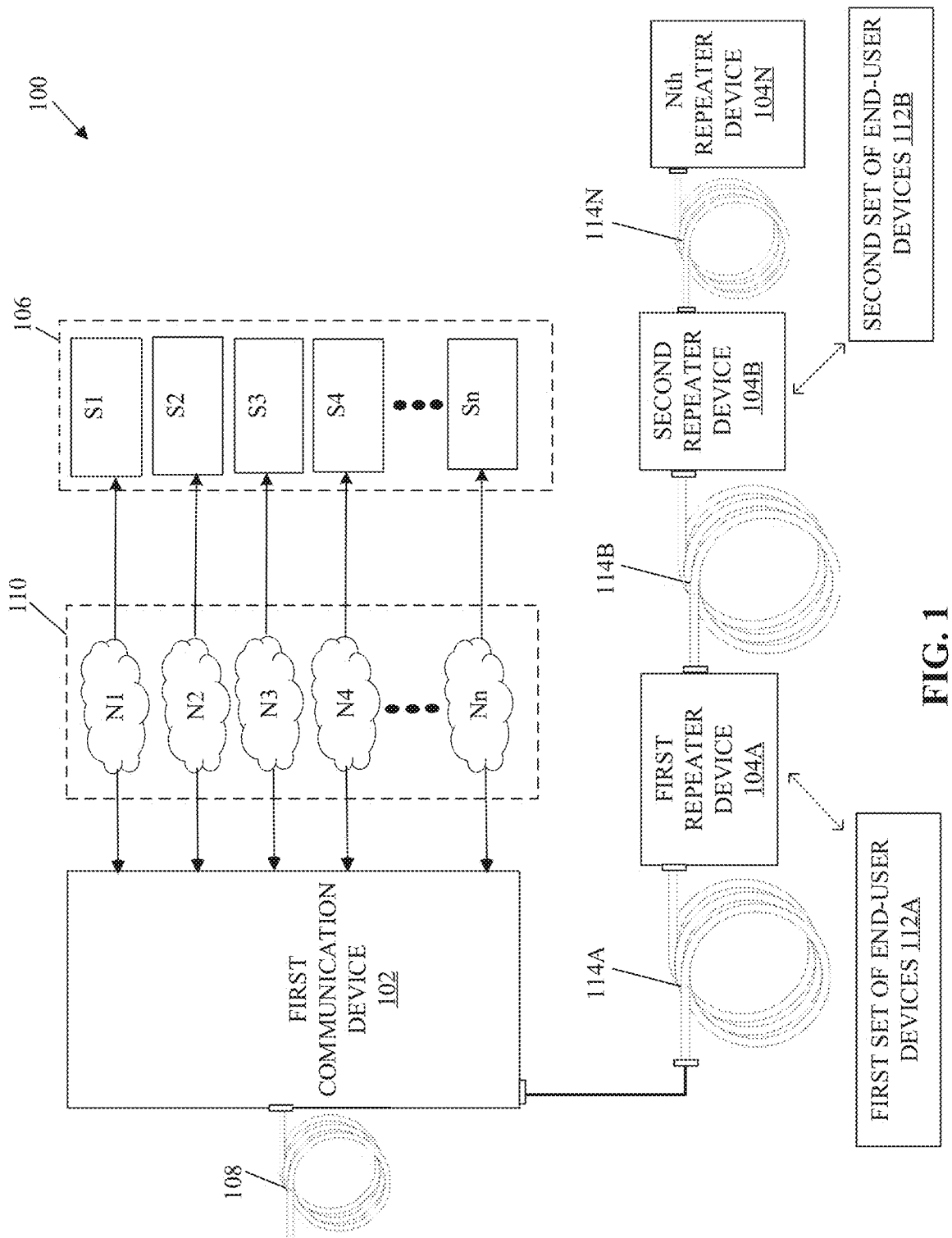
FIG. 1 is a diagram illustrating an exemplary edge communication system with cascaded repeater devices over wired medium, in accordance with an exemplary embodiment of the disclosure.

FIG. 1 is a diagram illustrating an exemplary edge communication system with cascaded repeater devices over wired medium, in accordance with an exemplary embodiment of the disclosure. With reference to FIG. 1, there is shown an edge communication system 100 that may include a first communication device 102, which may be a central communication device. The edge communication system 100 further includes a plurality of repeater devices 104A to 104N (namely, a first repeater device 104A, a second repeater device 104B, and an Nth repeater device 104N). There is further shown a plurality of communication systems 106, a first type of communication network 108, and a plurality of different type of networks 110.

The first communication device 102 may be a networking hardware that acts as a central communication device and a gateway (or a mediator) between the first type of communication network 108 (e.g. Internet or a core network) and the plurality of different type of networks 110. The first communication device 102 includes suitable logic, circuitry, and interfaces that may be configured to provide access to the first type of communication network 108 to the plurality of communication systems 106. The plurality of communication systems 106 may be communicatively coupled to the first communication device 102 via the plurality of different type of networks 110. The first communication device 102 may be a multiprotocol wireless range extender device that has a capability to extend range of different RF signals communicated over a plurality of different communication protocols (e.g. Wi-Fi, Bluetooth, Zigbee, cellular signals, and other wireless communication protocols) at the same time. Examples of the first communication device 102 may include, but is not limited to a home gateway device, a fifth generation (5G) modem, a backplane system, an evolved-universal terrestrial radio access-new radio (NR) dual connectivity (EN-DC) device, a 5G wireless access point, an advanced router, a bridge router, a network controller, a fixed wireless access (FWA) device, a server, a firewall device, or a network security device.

Each of the plurality of repeater devices 104A to 104N includes suitable logic, circuitry, and interfaces that may be configured to communicate with the first communication device 102 and one or more other repeater devices of the plurality of repeater devices 104A to 104N. For example, the first repeater device 104A may be configured to communicate with the first communication device 102, and one or more of other repeater devices of the plurality of repeater devices 104A to 104N in a parallel transmission or a chain transmission. In an implementation, in order to execute the chain transmission, the first repeater device 104A may communicate any RF signal received from the first communication device 102 further to the second repeater device 104B, which in turn may further communicate the RF signal to a further repeater device, such as the Nth repeater device 104N. Examples of the each of the plurality of repeater devices 104A to 104N (such as the first repeater device 104A) may include, but is not limited to a 5G wireless access point, a multiprotocol wireless range extender device, an evolved-universal terrestrial radio access-new radio (NR) dual connectivity (EN-DC) device, a NR-enabled repeater device, a wireless local area network (WLAN)-enabled device, or a wireless personal area network (WPAN)-enabled device.

Each of the plurality of communication systems 106 (e.g. S1 to Sn) includes suitable logic, circuitry, and interfaces that may be configured to communicate with the first communication device 102 in order to access the first type of communication network 108 (e.g. the Internet) for data communication in a multi-gigabit data rate. The plurality of communication systems 106 may be communicatively coupled to the first communication device 102 via the plurality of different type of networks 110 (i.e. via wireless or wired medium). Each of the plurality of communication systems 106 may be configured to communicate with the first communication device 102 in a plurality of different range of frequencies, such as 2.4 GHz, 5 GHz, or sub 6 GHz bands, which are typically considered as narrow bandwidths. Examples of the plurality of communication systems 106 may include, but is not limited to one or more wireless access points (e.g. a 2.4 GHz based wireless access point and a 5 GHz multiple input multiple output) MIMO capable wireless access point), a camera system, a radar system, an Internet-of-Things (IoT) controller, an IoT device, a Wi-Fi only device, a Bluetooth only device, a Zigbee only device, an orthogonal frequency division multiplexing (OFDM) communication system, a cellular communication system, such as a 2G, 3G, 4G, or 5G NR-enabled communication system.

In an implementation, the first type of communication network 108 may be a wired network, such as an optical fiber connection, which provides high-speed access (e.g. multi-gigabits data rate) to a core network, for example, Internet. In another implementation, the first type of communication network 108 may be a 5G cellular communication network having high data transfer rate (i.e. multi-gigabits data rate).

The plurality of different type of networks 110 (e.g. N1 to Nn) correspond to a hybrid network, which may include both wired and wireless networks. In an example, the plurality of different type of networks 110 may include a Wireless-Fidelity (Wi-Fi) network, a Bluetooth network, a Bluetooth low energy (BLE) network, a Zigbee network, a cellular network, an infrared communication network, a radio frequency for consumer electronics (RF4CE) network, a wireless sensor network, an Internet-of-Things network, a wired network, or other wireless network.

In operation, the first communication device 102 may be provided at a first location. The first communication device 102 may be communicatively coupled to the first type of communication network 108. In an implementation, the first communication device 102 may be connected to a modem. In another implementation, the first communication device 102 may be integrated with the modem (i.e. the functionalities of a modem (e.g. a Wi-Fi modem) may be integrated with the first communication device 102). The first communication device 102 may be configured to provide access to the first type of communication network 108 to the plurality of communication systems 106 that are communicatively coupled to the first communication device 102 via the plurality of different type of networks 110. In an example, the plurality of different type of networks 110 may include a first Wi-Fi network operating in a first frequency, a second Wi-Fi network operating in a second frequency that is different from the first frequency, or other low power Wi-Fi network (such as IEEE 802.11ah, also known as Wi-Fi "HaLow" or other variation of Wi-Fi based on IEEE 802.11), a Bluetooth network, a Bluetooth low energy (BLE) network, a wireless sensor network (e.g. adaptive network topology based network), a Zigbee network, a cellular network, an infrared communication, a radio frequency for consumer electronics (RF4CE), a citizens broadband radio service (CBRS) network, other short-range wireless communication network, such as a wireless personal area network, or even a wired network. For example, some of the communication systems (e.g. system S4) of plurality of communication systems 106 may be connected over a wired medium (e.g. N4).

The first communication device 102 at the first location may be configured to obtain a plurality of radio frequency (RF) signals corresponding to different communication protocols from the plurality of communication systems 106. The plurality of RF signals corresponds to a citizens broadband radio service (CBRS) signal, a wireless wide area network (WWAN) signal, a wireless local area network (WLAN) signal, a wireless personal area network (WPAN) signal, or a combination thereof. The plurality of RF signals corresponding to different communication protocols may be obtained via the plurality of different type of networks 110. The different communication protocols may correspond to (i.e. may include) a Wireless-Fidelity (Wi-Fi) protocol, a Bluetooth Protocol, a Bluetooth low energy (BLE) protocol, a Zigbee protocol, a cellular communication protocol, an infrared communication protocol, a radio frequency for consumer electronics (RF4CE) protocol, a wireless sensor network protocol, a citizens broadband radio service (CBRS) protocol, or different variations of wireless wide area network (WWAN), wireless local area network (WLAN), wireless personal area network (WPAN) protocols, or other types of wired or wireless communication protocols. In an example, the first communication device 102 may include (i.e. may be realized by) various components, such as RF front-end (transmitter front-ends and receiver front-ends), a digital signal processor, low-noise amplifiers, phase shifters, power combiners, power dividers, power amplifiers, logical control units, a combination of functionalities of modems, a phased lock loop (PLL) circuits, and mixers.

In accordance with an embodiment, the first communication device 102 may be further configured to upconvert a frequency of each of the plurality of RF signals to a different frequency. For example, the plurality of communication systems 106 may include a first Wi-Fi access point, a second Wi-Fi access point, a Bluetooth low energy (BLE)-only IoT device, a ZigBee-based system, a Bluetooth-based system, a camera system, a cellular system, and/or an IoT controller or multiple (e.g. thousands) of IoT devices. The first Wi-Fi access point may have two antennas and may operate in 2.4 GHz frequency (i.e. network band) and the second Wi-Fi access point may have a MIMO-based antenna system and may operate in 5 GHz frequency. In an implementation, in certain scenarios, the first Wi-Fi signals from the first Wi-Fi access point and the second Wi-Fi signals from the second Wi-Fi access point may operate in same frequency (i.e. the first frequency and the second frequency may be same, for example, 5 GHz). In such a case, at least one of the first Wi-Fi signals and the second Wi-Fi signals may be upconverted to a different frequency. In another scenario, the camera system and the second Wi-Fi access point may operate in same WLAN frequency (e.g. 5 GHz). In such a case, only the RF signal carrying video content from the camera system may be upconverted to 5.2 GHz frequency. Alternatively, in another implementation, each of the first Wi-Fi signals (e.g. 2.4 GHz frequency), the second Wi-Fi signals (e.g. 5 GHz), the BLE signal, the ZigBee signal, the Bluetooth signal, the RF signal, and the cellular signal may be upconverted to a different frequency so that each RF signal received from each communication system of the plurality of communication systems 106 has a different upconverted frequency. The first communication device 102 may be further configured to generate RF waveform of a specified frequency (e.g. a mmWave signal). In accordance with an embodiment, the first communication device 102 may be further configured to map and align the plurality of RF signals corresponding to different communication protocols in the RF signal (e.g. the generated mmWave RF waveform) in accordance to a number of source antennas from which the plurality of RF signals is obtained. For example, if a communication system of the plurality of communication systems 106 has two antennas, then these two antennas may be mapped to two corresponding RF signals in the mmWave RF signal. Examples of the different communication protocols include, but is not limited to Wi-Fi 2.4 GHz, 3.6 GHz, 5 GHz (i.e. IEEE 802.11 protocol and variations thereof), Zigbee protocol, Bluetooth protocol, BLE, or other protocols that typically operate in the range 1 MHz to 6 GHz or even higher). In the above example, as the first Wi-Fi access point have two antennas, thus, the two antennas may be mapped to two corresponding signals in the mmWave RF signal of 60 GHz. Similarly, the second Wi-Fi access point that may have the MIMO-based antenna system (e.g. four antennas) may be mapped to four corresponding signals in the mmWave RF signal. Similarly, one antenna of other systems may correspond to one corresponding signal in the mmWave RF signal.

In accordance with an embodiment, the plurality of RF signals may be aligned with different spacing. In an example, the plurality of RF signals may be placed next to each other in the frequency domain, minimizing the frequency gaps between different waveforms in the frequency domain. In another example, the plurality of signals is placed with some gap or guard interval in between to ease the selection filtering needed to select and disaggregate these RF waveforms. In another example, as a large amount of spectrum is available over the RF signal of the specified frequency (e.g. the mmWave signal), the plurality of RF signals may be placed with suitable large gaps in between. This spaced alignment of each RF signal in the mmWave RF signal may be greater than a defined threshold and may be utilized for purpose of minimizing sensitivity and degradation due to other interfering signals operating in the same frequency bands. For example, in a conventional scenario, assuming, there are four RF waveforms from systems S1, S2, S3, S4, where each RF waveform may occupy 400 MHz spectrum. If all four streams (RF waveforms or signals) are packed and aligned next to each other in frequency domain, a bandwidth of about 1.6 GHz will be occupied. In such conventional scenario, if a wideband interfering signal is encountered, all four streams (i.e. all four RF waveforms) may be impacted (and overlapped) at same time, and hence may likely disrupt communication link. In some embodiments of the present disclosure, the four RF waveforms if placed in frequency domain with about 1 GHz gap in between adjacent streams (RF waveforms). In this case, presence or appearance of a wideband interfering signal would only overlap/impact one out of four streams (i.e. one of the four RF waveforms). Given the MIMO and channel coding applied on the four streams (i.e. the four RF waveform), there is a higher probability the original information stream can be recovered at receiver side (e.g. end-user devices), given the redundancy in the correction capability embedded into the streams being transmitted over the air.

The first communication device 102 may be further configured to merge the obtained plurality of RF signals corresponding to different communication protocols into the RF signal of the specified frequency (e.g. the mmWave signal). In an example, the plurality of RF signals upconverted at different frequency are multiplexed in a frequency division multiplexing. In another example, the plurality of RF signals at different frequency are multiplexed in a time-division multiplexing. In an example, data received over the plurality of RF signals may be converted in the form of bits, before transmission of such bits over a wired medium, such as the first wired medium 114A, by manipulation of frequency and one or more other signal characteristic, such as amplitude, and/or phase, of the RF signal of the specified frequency (e.g. the mmWave signal). In an example, higher order modulation schemes, such as 16 QAM, 64 QAM, may be used to allow more information to be packed into a single radio wave, which improves spectral efficiency of wireless communication.

The first communication device 102 may be further configured to transmit, through a wired medium (such as the first wired medium 114A), the RF signal of the specified frequency (e.g. the mmWave signal) to the first repeater device 104A that further transfers the mmWave RF signal to at least one repeater device, such as the second repeater device 104B via a second wired medium 114B. In an implementation, the first communication device 102 may be further configured to provide the RF signal of the specified frequency (e.g. the mmWave signal) to the plurality of repeater devices 104A to 104N that are arranged at a plurality of different locations and are communicatively coupled in a cascaded structure over wired mediums in a chain transmission. In another implementation, the first communication device 102 may be further configured to provide the RF signal of the specified frequency (e.g. the mmWave signal) to the plurality of repeater devices 104A to 104N in a parallel transmission. In an implementation, the specified frequency of the mmWave RF signal may be in the range of 10 gigahertz (GHz) to 300 GHz. In another implementation, the specified frequency of the RF signal may be in the range of 55 gigahertz (GHz) to 65 GHz. In yet another implementation, the specified frequency of the RF signal may be 60 gigahertz (GHz).

In accordance with an embodiment, each of the plurality of RF signals communicated over a corresponding type of network of the plurality of different type of networks 110 has a defined communication range. A coverage of the plurality of RF signals corresponding to the different communication protocols is extended beyond the defined communication range based on the transmit of the RF signal of the specified frequency (e.g. the mmWave signal) that includes the plurality of RF signals, over one or more wired mediums.

In accordance with an embodiment, at least one repeater device (such as the first repeater device 104A of the plurality of repeater devices 104A to 104N) may be arranged at a second location of the plurality of different locations. The first repeater device 104A may be configured to obtain the RF signal of the specified frequency (e.g. the mmWave signal) through the first wired medium 114A from the first communication device 102. The first repeater device 104A may be further configured to extract a plurality of RF signals corresponding to different communication protocols from the obtained RF signal of the specified frequency. The first repeater device 104A may be further configured to down-convert the extracted plurality of RF signals to a source frequency (i.e. original frequency) that is same as the frequency of a corresponding RF signal of the plurality of RF signals obtained from the plurality of communication systems 106. For example, the first repeater device 104A may be configured to down-convert the one or more extracted RF signals to a source frequency (i.e. original frequency of 5 GHz or 2.5 GHz) that is same as the frequency of a corresponding RF signal of the plurality of RF signals obtained from the plurality of communication systems 106. Thereafter, the first repeater device 104A may be further configured to distribute, from the obtained RF signal of the specified frequency (e.g. the mmWave signal), the plurality of RF signals corresponding to different communication protocols wirelessly to a plurality of end-user devices (such as the first set of end-user devices 112A) or one or more communication systems of the plurality of communication systems 106. The first repeater device 104A may be configured to distribute the plurality of RF signals wirelessly the one or more communication systems when such communication systems moves from the first location towards the second location and are within the communication range of the first repeater device 104A.

Similar to the first repeater device 104A, each repeater device of the plurality of repeater devices 104A to 104N is configured to extract, from the RF signal of the specified frequency (e.g. the mmWave signal), at least one of the merged plurality of RF signals for consumption, thereby increase coverage of the plurality of RF signals for an always-connected experience. For example, a user operating an end-user device may communicate with the first communication device 102 or the first repeater device 104A to receive a data item over a Bluetooth e network from the first communication device 102 (or the first repeater device 104A) in a first room. The user carrying the end-user device may move to another room and may get connected with the second repeater device 104B. However, the end-user device may continue to receive the data item from the second repeater device 104B (e.g. based on extraction of the original Zig Bee signal by the second repeater device 104B).

Alternatively, in accordance with an embodiment, the first communication device 102 may not directly upconvert the obtained plurality of RF signals corresponding to different communication protocols into the RF signal of the specified frequency (e.g. the mmWave signal). In such embodiment, the first communication device 102 may be configured to map and merge the obtained plurality of RF signals corresponding to different communication protocols into a first RF signal of a first frequency (e.g. 6 GHz or 10 GHz). Thereafter, the first communication device 102 may be further configured to transmit, through the first wired medium 114A, the first RF signal of the first frequency to the first repeater device 104A of the plurality of repeater devices 104A to 104N. In this embodiment, the first repeater device 104A of the plurality of repeater devices 104A to 104N may be further configured to upconvert the first RF signal of the first frequency to the mmWave RF signal of the specified frequency, and then transmit, over the second wired medium 114B, the RF signal of the specified frequency (e.g. the mmWave signal) to the at least one repeater device, such as the Nth repeater device 104N.

In some embodiments, multi-stream gain adjustment or equalization may be applied on the plurality of RF signals extracted from the RF signal of the specified frequency throughout a chain of repeaters (i.e. the plurality of repeater devices 104A to 104N). This relative gain adjustment may be applied in one (e.g. the first repeater device 104A or the plurality of repeater devices 104A to 104N). Such gain adjustments may be applied on the incoming RF waveforms/signals or outgoing waveforms/signals. In an example, the relative gain adjustment/equalization may be applied for different purposes and/or due to different conditions, for example, to compensate for gain imbalances throughout the chain. For example, streams/RF signals received by different antennas of first repeater device 104A (e.g. a repeater device) from one or more of the plurality of end-user devices during uplink to the first communication device 102 (Node B towards Node A), may have very different relative signals levels. Aggregating these received signals next to each other in the frequency domain, may degrade the signal quality of weaker signals, due to leakage of out-of-band emissions of comparatively stronger signals. To address this issue, some relative gain equalization may be applied at the first repeater device 104A, before aggregating the RF signals from the end-user devices and sending them up upstream towards the first communication device 102 (or another repeater device which then transmits to the first communication device 102). In some embodiments, the relative gain values may be coordinated, or shared with, or may be set by Node A (i.e. the first communication device 102). This enables the baseband processing units (MIMO pre-coding, decoding) to take in account such gain adjustment (which is not part of actual channel propagation between the first repeater device 104A and an end-user device, such as Node B or one of the first set of end-user devices 112A) in their MIMO processing.

In some embodiments, the plurality of repeater devices 104A to 104N may not perform any digital processing, demodulation, or packet processing. All digital and baseband processing for communication to and from the plurality of end-user devices (e.g. standalone user equipment (UEs), such as the first set of end-user devices 112A or the second set of end-user devices 112B) are performed centrally at the first communication device 102. The plurality of repeater devices 104A to 104N may not perform any waveform processing (e.g. demodulation), hence keeping the latency through the chain of the plurality of repeater devices 104A to 104N (e.g. repeater or relay devices) close to zero (e.g. orders of 10s of nanosecond). In other words, nearly zero latency is introduced to the plurality of RF signals, allowing the first communication device 102 and the plurality of end-user devices (such as the first set of end-user devices 112A or the second set of end-user devices 112B) to mitigate very small latencies through the repeater chains (i.e. the plurality of repeater devices 104A to 104N). For example, the first communication device 102 may be Node A, which may be a central unit (e.g. a central multiprotocol access point), and Nodes B/B' may be complete standalone UEs communicatively coupled to the Node A directly, or to Wi-Fi-enabled devices (e.g. the plurality of repeater devices 104A to 104N) linked to multiprotocol access point Node A. All user/network management functions as well as digital processing of signals/streams may performed by the Node A through its embedded digital unit (e.g. a digital signal processor). The plurality of repeater devices 104A to 104N (e.g. repeater devices) may not perform demodulation/remodulation of data streams. Although, the first repeater device 104A or the second repeater device 104B acts as an access point (or small cell) that provides access to end users Node B/B', and also provides coverage to end users at a propagation frequency of sub 6 GHz that is less than the specified frequency of the mmWave Rf signal, all baseband/digital processing to support and maintain connections to the Nodes B/B' may be performed and managed by the Node A (i.e. the first communication device 102).

In accordance with an embodiment, each of the plurality of repeater devices 104A to 104N may be further configured to execute multiple-input multiple-output (MIMO) communication with one or more end-user devices that are wirelessly connected to corresponding repeater device. For example, the first repeater device 104A may be configured to execute MIMO communication with the first set of end-user devices 112A and the second repeater devices 104B may be configured to execute MIMO communication with the second set of end-user devices 112B. Each of the plurality of repeater devices 104A to 104N may be further configured to execute MIMO communication with one or more communication systems of the plurality of communication systems 106 when such communication systems are communicatively coupled to respective repeater devices. The MIMO communication may be executed at a sub 6 gigahertz (GHz) frequency that is less than the specified frequency of the RF signal (e.g. the mmWave signal). The RF signal (e.g. the mmWave signal) is received at specified frequency (e.g. 60 GHz) over wired medium at respective repeater devices, such as the first repeater device 104A or the second repeater device 104B, whereas the MIMO communication is executed at a different frequency, such as sub 6 gigahertz, with the plurality of end-user devices or the one or more communication systems of the plurality of communication systems 106. This mode of operation is beneficial and advantageous, given that the propagation at lower frequency (sub 6 GHz) results in rich scattering channel response, which leads to better MIMO capacity and MIMO performance.

In accordance with an embodiment, the first communication system S1 and the second communication system S2 may be portable systems and may be moved to a second physical area (e.g. a second room) at a second location from the first physical area (e.g. a first room) at first location. In an example, the second physical area may be more than 700 meters from the first physical area. Alternatively stated, the second physical area may be beyond the usual communication range of a first network (e.g. beyond 100 meters) associated with a first protocol (e.g. the Bluetooth protocol) and a second network (beyond 150 feet) associated with the second protocol (e.g. Wi-Fi protocol) from the first communication device 102. In such a case, the first communication system S1 may continue to receive a first content item (i.e. the data item) uninterruptedly from the first repeater device 104A at the second physical area (i.e. the second room) at the second location. Similarly, the second communication system S2 may continue to receive the second content item (i.e. a 4K video) uninterruptedly from the first repeater device 104A at the second physical area (i.e. the second room) at the second location. In other words, both the first communication system S1 and the second communication system S2 may be communicatively coupled over different wireless network (i.e. the Bluetooth and the Wi-Fi network in this case) with the same device, such as the first repeater device 104A, via which MIMO communication is established to continue receiving respective content items, such as the first content item and the second content item, from the first communication device 102. Based on the RF signal of the specified frequency (e.g. the mmWave signal) received, over the first wired medium 114A, from the first communication device 102, the first repeater device 104A distributes the first content item to the first communication system S1 wirelessly over a Bluetooth signal (i.e. the Bluetooth protocol). Similarly, based on the mmWave RF signal of the specified frequency received from the first communication device 102, the first repeater device 104A is able to distribute the second content item to the second communication system S2 via a WI-Fi signal within the second physical area (i.e. the second room) at the second location when the first communication system S1 and the second communication system S2 are moved to the second physical area (i.e. the second room). The first content item may be carried over a first RF signal of the plurality of RF signals present in the mmWave RF signal. Similarly, the second content item may be carried over a second RF signal of the plurality of RF signals present in the mmWave RF signal. Thus, the two different RF signals of the plurality of RF signals that carries the first content item and the second content item may be retrieved at the first repeater device 104A based on the RF signal (e.g. the mmWave signal) of the specified frequency (e.g. 60 GHz) received from the first communication device 102 over the first wired medium 114A. Thus, the disclosed edge communication system 100 provides a noise-free and an always-connected experience as a result of its multiprotocol feature. The multiprotocol feature of the edge communication system 100 provides a capability to the first communication device 102 and the cascaded repeater devices connected over wired mediums with each other (such as the first repeater device 104A) to handle different wireless communication protocols concurrently in terms of extending their range as well as increasing bandwidth concurrently while reducing latency to near zero in the edge communication system 100 for high performance content communication using a combination of wired and wireless medium, the multiprotocol feature, and using both mmWave RF signal and sub 6 GHz frequencies for communication.

Figure 2A:
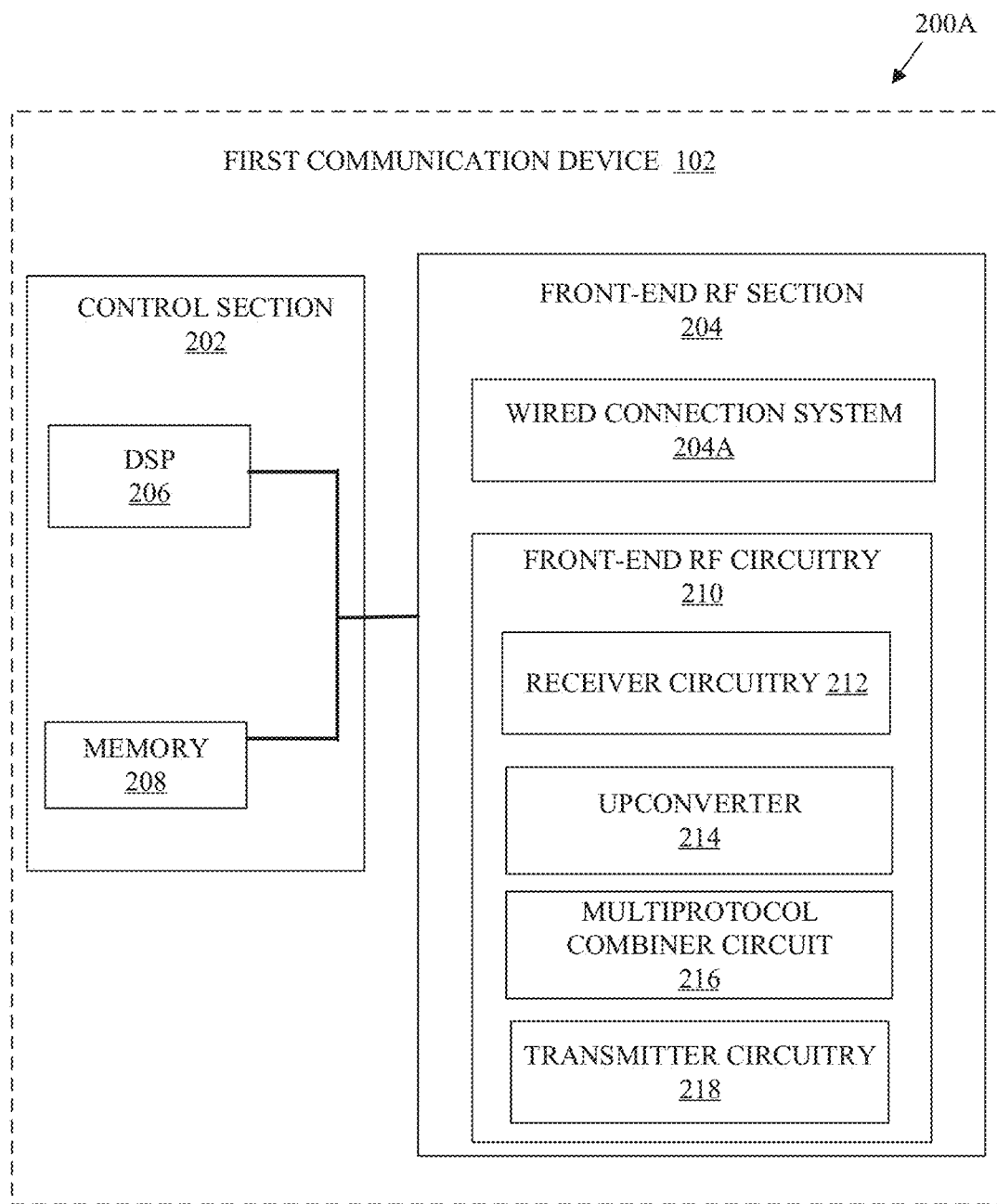
FIG. 2A is a block diagram that illustrates various components of an exemplary first communication device of an edge communication system, in accordance with an exemplary embodiment of the disclosure.

FIG. 2A is a block diagram illustrating various components of an exemplary first communication device of an edge communication system, in accordance with an exemplary embodiment of the disclosure. FIG. 2A is explained in conjunction with elements from FIG. 1. With reference to FIG. 2A, there is shown a block diagram 200A of the first communication device 102. The first communication device 102 may include a control section 202 and a front-end RF section 204. The control section 202 may include a digital signal processor (i.e. a DSP 206) and a memory 208. The control section 202 may be communicatively coupled to the front-end RF section 204. The front-end RF section 204 may include a wired connection system 204A and front-end RF circuitry 210. The front-end RF circuitry 210 may further include a receiver circuitry 212, an upconverter 214, a multiprotocol combiner circuit 216, and a transmitter circuitry 218.

The wired connection system 204A refers to ports to connect to wired mediums, such as a coaxial cable, a fiber optic cable and the like, to receive input from the one or more of the plurality of communication systems 106 and provide output to at least one repeater device (such as the first repeater device 104A) of the plurality of repeater devices 104A to 104N. In an implementation, the wired connection system 204A may include suitable logic, circuitry, interfaces and/or code that is configured to convert electrical signal into the optical signal and transmit the optical signal via a wired medium, such as the first wired medium 114A, to the first repeater device 104A. Data may be communicated (sent and/or received) in form of the electrical signals which may be converted to optical signal (such as the mmWave RF signal). The wired connection system 204A may be further configured to receive the optical signal via the wired medium (e.g. an optical link) and convert the optical signal into the electric signal. In some embodiments, the wired connection system 204A may include a Receiver Optical Sub Assembly (ROSA) configured to communicate via the first type of communication network 108. The ROSA may include one or more components, such as photodetector, electro-optical interface, and the like. Optionally, a Bi-Directional Optical Sub Assembly (BOSA) may be provided instead of ROSA. In some embodiments, the wired connection system 204A may further include Transmitter Optical Sub Assembly (TOSA). The TOSA may be configured to convert electrical signal into optical signal, and then transmit the mmWave RF signal as optical signal to the first repeater device 104A. The TOSA may comprise one or more components such as photodetector, electro-optical interface, and the like. Optionally, the first communication device 102 may include a Bi-Directional Optical Sub Assembly (BOSA) instead of TOSA. Alternatively, in some embodiments, the wired connection system 204A may communicate with a coaxial cable or other type of wired mediums instead of optical fiber.

The DSP 206 include suitable logic, circuitry, and/or interfaces configured to control the front-end RF circuitry 210. The first communication device 102 may be a programmable device, where the DSP 206 may execute instructions stored in the memory 208. Example of the implementation of the DSP 206 may include, but are not limited to an embedded processor, a microcontroller, a specialized DSP, a Reduced Instruction Set Computing (RISC) processor, an Application-Specific Integrated Circuit (ASIC) processor, a Complex Instruction Set Computing (CISC) processor, and/or other processors.

The memory 208 may include suitable logic, circuitry, and/or interfaces that may be configured to store instructions executable by the DSP 206. Examples of implementation of the memory 208 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory. It is to be understood by a person having ordinary skill in the art that the control section 202 may further include one or more other components, such as an analog to digital converter (ADC), a digital to analog (DAC) converter, a cellular modem, and the like, known in the art, which are omitted for brevity.

The front-end RF circuitry 210 may include the receiver circuitry 212, the upconverter 214, the multiprotocol combiner circuit 216, and the transmitter circuitry 218. The receiver circuitry 212 may be configured to receive (or obtain) a plurality of RF signals corresponding to different communication protocols via the plurality of different type of networks 110. For example, the receiver circuitry 212 may be configured to receive Wi-Fi signals, for example, in 2.4 GHz to 5 GHz, Bluetooth signals, Zigbee signals, infrared signals, or other types of RF signals, such as wireless wide area network signals over one or more frequencies, wireless local area network signals, or wireless personal area network signals, or a combination thereof, from the plurality of communication systems 106. In an example, the receiver circuitry 212 may include a cascading receiver chain comprising various components (e.g., an antenna array, a set of low noise amplifiers (LNA), a set of receiver front end phase shifters, and a set of power combiners) for the signal reception (not shown for brevity).

The upconverter 214 may be configured to upconvert a frequency of each of the plurality of RF signals to a different frequency. In some embodiments, the upconverter 214 may be a phased locked loop (PLL) circuit may be provided in the first communication device 102, which acts a local oscillator and may be associated with the transmitter circuitry 218 to facilitate up conversion of each input RF signals to a different frequency before transmission.

The multiprotocol combiner circuit 216 may be configured to merge the obtained plurality of RF signals corresponding to different communication protocols into a mmWave RF signal of a specified frequency, and transmit, over the first wired medium 114A, to the first repeater device 104A. Alternatively, the multiprotocol combiner circuit 216 may be configured to merge the obtained plurality of RF signals corresponding to different communication protocols into a first RF signal (a multiplexed signal but not mmWave RF signal) having a frequency less than the mmWave RF signal. In such as case, the up conversion of the first RF signal may be executed at the first repeater device 104A. In an implementation, the multiprotocol combiner circuit 216 may be configured to merge the obtained plurality of RF signals corresponding to different communication protocols under the control of the DSP 206 (e.g. when an instruction to merge is communicated by the DSP 206 to the multiprotocol combiner circuit 216, via a system bus (not shown). The obtained plurality of RF signals corresponding to different communication protocols may be multiplexed (Mux) into the mmWave RF signal of the specified frequency (e.g. 60 GHz). In some embodiments, the multiprotocol combiner circuit 216 may be further configured to insert one pilot tone of a defined frequency into the mmWave RF signal of the specified frequency. The defined frequency may be distinct and different from any other upconverted frequency of the plurality of RF signals or the specified frequency.

In an implementation, the transmitter circuitry 218 may be a part of the TOSA. The transmitter circuitry 218 may be configured to transmit the mmWave RF signal of the specified frequency, over the first wired medium 114A, to the first repeater device 104A. In an implementation, the transmitter circuitry 218 may be configured to transmit the mmWave RF signal over the first wired medium 114A under the control of the DSP 206 (e.g. when an instruction to transmit is communicated by the DSP 206 to the transmitter circuitry 218. In an example, transmitter circuitry 218 may include a cascading transmitter chain comprising various components for baseband signal processing or digital signal processing. In an example, the mmWave RF signal in the specified frequency may be distributed to other repeater devices of the plurality of repeater devices 104A to 104N to form a mmWave mesh network over wired mediums. In accordance with an embodiment, the front-end RF circuitry 210 may receive input RF signals and transmit the one or more mmWave RF signals in accordance with multiple-input multiple-output (MIMO) reception and transmission with the plurality of communication systems 106, whereas may communicate with one or more repeater devices over wired mediums.

Figure 2B:
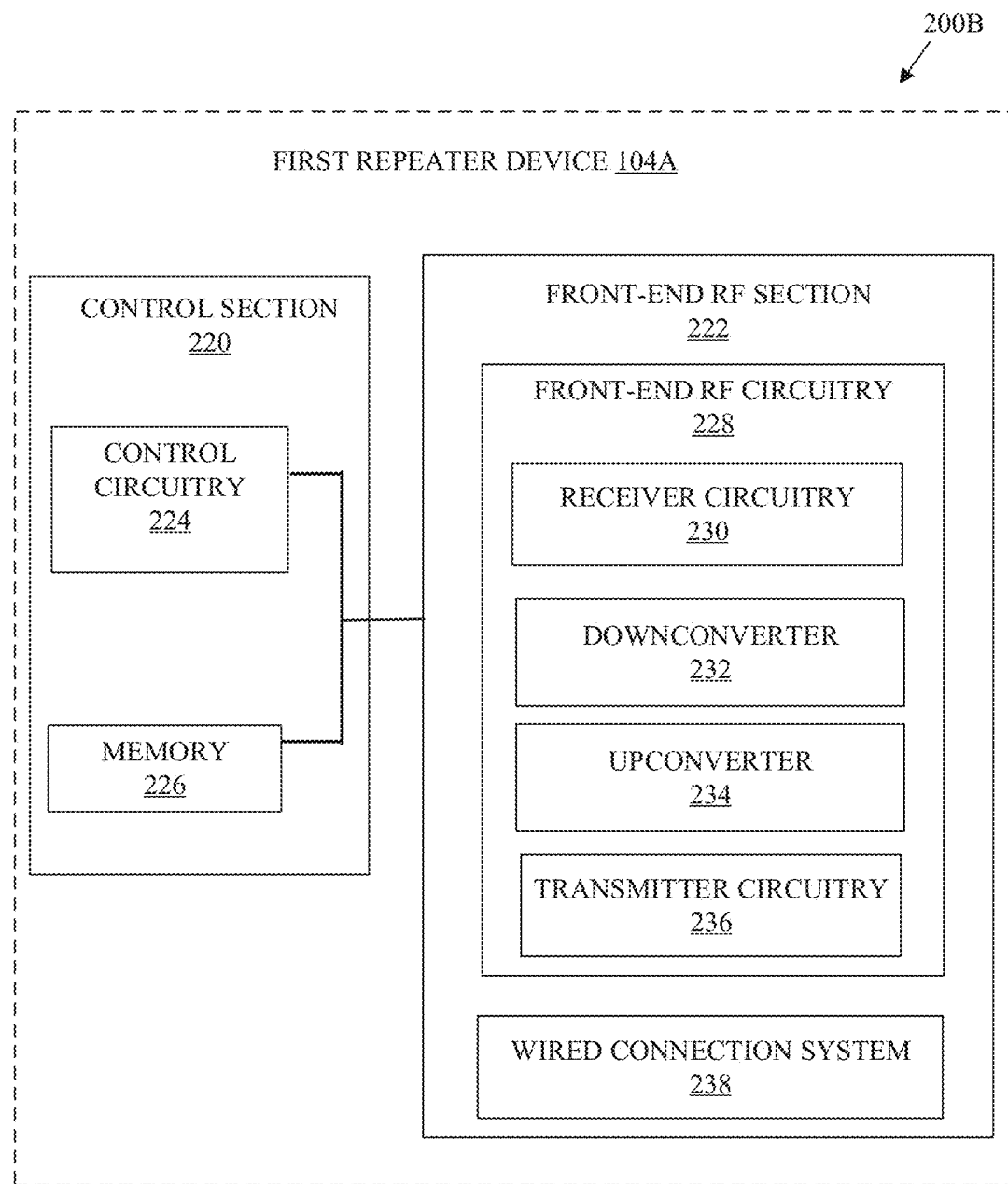
FIG. 2B is a block diagram that illustrates various components of an exemplary repeater device of an edge communication system, in accordance with an exemplary embodiment of the disclosure.

FIG. 2B is a block diagram illustrating various components of an exemplary repeater device of an edge communication system, in accordance with an exemplary embodiment of the disclosure. FIG. 2B is explained in conjunction with elements from FIG. 1 and FIG. 2A. With reference to FIG. 2B, there is shown a block diagram 200B of the first repeater device 104A. The first repeater device 104A may include a control section 220 and a front-end RF section 222. The control section 220 may include control circuitry 224 and a memory 226. The control section 220 may be communicatively coupled to the front-end RF section 222. The front-end RF section 222 may include front-end RF circuitry 228. The front-end RF circuitry 228 may further include a receiver circuitry 230, a downconverter 232, an upconverter 234, and a transmitter circuitry 236. The front-end RF section 222 may also include a wired connection system 238.

The control circuitry 224 may be configured to extract one or more RF signals from the plurality of RF signals corresponding to different communication protocols from the mmWave RF signal received over wired medium without performing any demodulation or digital signal processing to minimize latency.

The memory 226 may be configured store values of relative gain equalization that may be applied at the first repeater device 104A, before aggregating the RF signals from the end-user devices, such as the first set of end-user devices 112A, and sending them up upstream towards the first communication device 102 (or another repeater device which then transmits to the first communication device 102). In some embodiments, the relative gain values may be received from the first communication device 102. This enables the baseband processing units (MIMO pre-coding, decoding) to take in account such gain adjustment (which is not part of actual channel propagation between the first repeater device 104A and an end-user device, such as the first set of end-user devices 112A, in their MIMO processing. Examples of the implementation of the memory 226 may be same as that of the memory 208.

The front-end RF circuitry 228 includes the receiver circuitry 230, the downconverter 232, the upconverter 234, and the transmitter circuitry 236. The front-end RF circuitry 228 supports multiple-input multiple-output (MIMO) operations, and may be configured to execute MIMO communication with a plurality of end-user devices, such as the first set of end-user devices 112A, or the one or more communication systems of the plurality of communication systems 106. The MIMO communication is executed at a sub 6 gigahertz (GHz) frequency that is less than the specified frequency of the mmWave RF signal. The mmWave RF signal is received at a specified frequency (e.g. 60 GHz), whereas the MIMO communication is executed at a different frequency, such as sub 6 gigahertz, with the plurality of end-user devices or the one or more communication systems of the plurality of communication systems 106. This mode of operation is beneficial and advantageous, given that the propagation at lower frequency (sub 6 GHz) results in rich scattering channel response, which leads to better MIMO capacity and MIMO performance. The downconverter 232 may be configured to down-convert one or more extracted RF signal to a source frequency that is same as the frequency of a corresponding RF signal of the plurality of RF signals obtained from the plurality of communication systems 106. Similarly, the downconverter 232 may be configured to down-convert all the plurality of RF signal to its original source frequency (e.g. 5 GHz, 2.5 GHz and the like). In some embodiments, the upconverter 234 may be configured to upconvert the RF signals received from the end-user devices for further distribution to the first communication device 102 or relay to other repeater devices, such as the second repeater device 104B.

The transmitter circuitry 236 may be configured to further forward the received mmWave RF signal of the specified frequency, over the second wired medium 114B, to the second repeater device 104B. The transmitter circuitry 236 may be configured to communicate with the plurality of end-user devices, such as the first set of end-user devices 112A. In an implementation, the transmitter circuitry 236 may be configured to transmit the mmWave RF signal of the specified frequency under the control of the control circuitry 224. Examples of implementation of the transmitter circuitry 236 may be similar to that of the transmitter circuitry 218 of FIG. 2A.

The wired connection system 238 may include ports to connect to wired mediums, such as a coaxial cable, a fiber optic cable and the like, to receive input from the first communication device 102 through the first wired medium 114A and provide output to at least one another repeater device (such as the second repeater device 104B) of the plurality of repeater devices 104A to 104N, over the second wired medium 114B. Examples of implementation of the wired connection system 238 may be similar to that of the wired connection system 204A of FIG. 2A.

Figure 3:
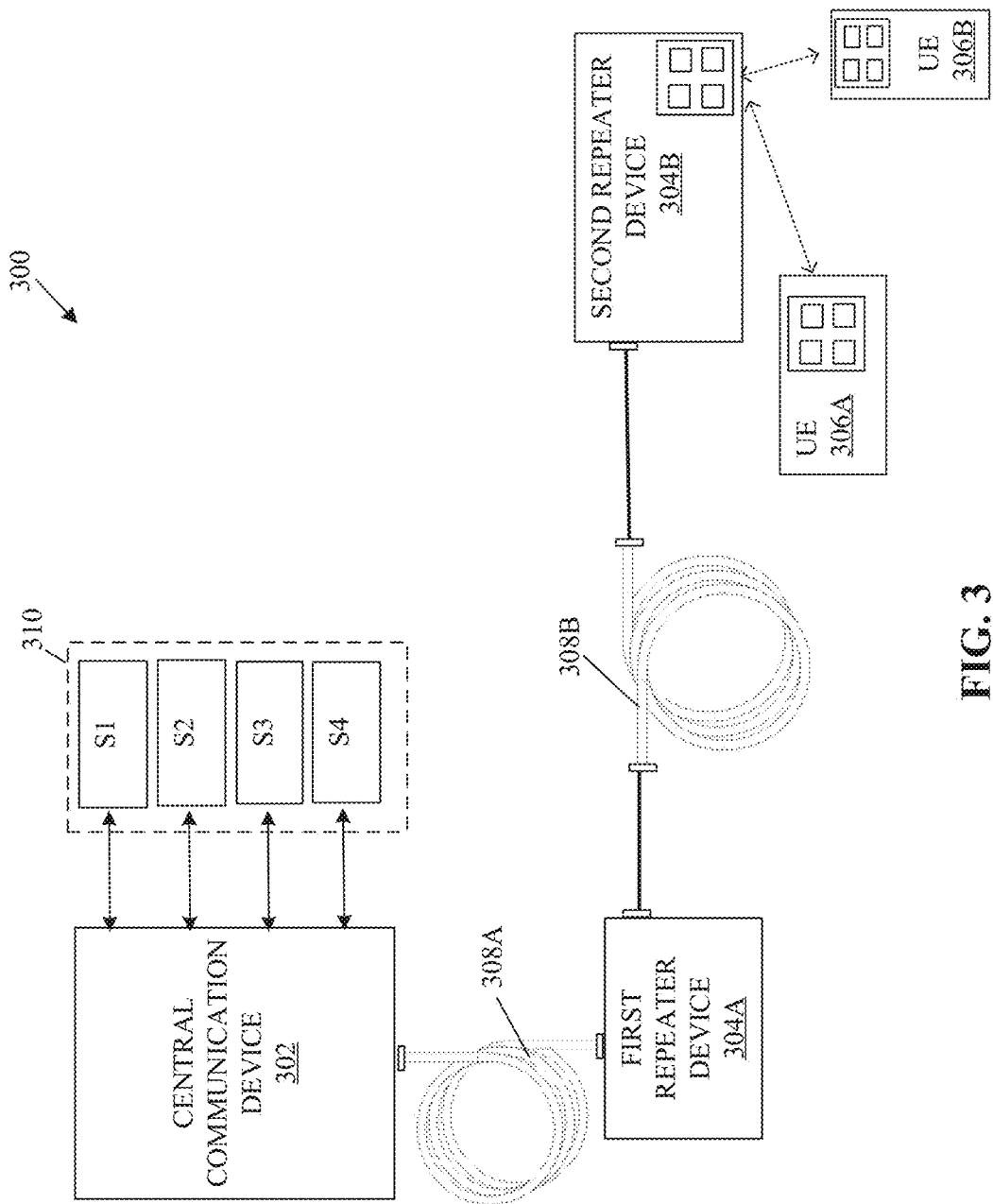
FIG. 3 is a diagram illustrating an exemplary scenario of implementation of an edge communication system with cascaded repeater devices over wired medium, in accordance with an exemplary embodiment of the disclosure.

FIG. 3 is a diagram illustrating an exemplary scenario of implementation of an edge communication system with cascaded repeater devices over wired medium, in accordance with an exemplary embodiment of the disclosure. FIG. 3 is explained in conjunction with elements from FIGS. 1, 2A, and 2B. With reference to FIG. 3, there is shown an exemplary scenario 300 of an edge communication system that include a central communication device 302 and a plurality of repeater devices, such as a first repeater device 304A and a second repeater device 304B. The central communication device 302 may be at a first location and may be communicatively coupled to the first repeater device 304A via a first wired medium 308A. The first repeater device 304A may be arranged at a second location and the second repeater device 304B may be arranged at a third location of a defined physical area, such as home, a building, or an enterprise. The first repeater device 304A may be communicatively coupled to the second repeater device 304B via a second wired medium 308B. There is further shown user equipment (UEs), such as UE 306A and UE 306B wirelessly coupled to the second repeater device 304B.

In accordance with the exemplary scenario 300, the plurality of repeater devices (such as the first repeater device 304A and the second repeater device 304B) are arranged at a plurality of different locations and are communicatively coupled in a cascaded structure over wired mediums, such as the second wired medium 308B. The central communication device 302 may be configured to obtain a plurality RF signals corresponding to different communication protocols from the plurality of communication systems 310. For example, Wi-Fi signals at 5 GHz band may be obtained from the communication system S1 that may be a first Wi-Fi access point. Similarly, Wi-Fi signals at 2.5 GHz may be obtained from the communication system S2 that may be second Wi-Fi access point; a Bluetooth signal may be obtained from the communication system S3 that may be an IoT device, and the communication system S4 (e.g. a camera system) may be connected via a wired connection with the central communication device 302 to exchange video content. The central communication device 302 may be further configured to merge the obtained plurality of RF signals corresponding to different communication protocols into a mmWave RF signal of a specified frequency. The central communication device 302 may be further configured to transmit, through the first wired medium 308A, the mmWave RF signal of the specified frequency (e.g. at 60 GHz) to the first repeater device 304A of the plurality of repeater devices. The first repeater device 304A at the second location may be further configured to communicate, over the second wired medium 308B, the mmWave RF signal of the specified frequency (e.g. at 60 GHz) to the second repeater device 304B at a third location of the plurality of different locations. The second repeater device 304B may be further configured to distribute, from the mmWave RF signal, a wireless wide area network (WWAN) signal, a wireless local area network (WLAN) signal, a citizens broadband radio service (CBRS) signal, a wireless personal area network (WPAN) signal, or a combination thereof that corresponds to the plurality of RF signals, wirelessly to a plurality of end-user devices, such as the UE 306A and the UE 306B.

The central communication device 302 may be configured to exchange a plurality of data streams with the plurality of end-user devices and the one or more communication systems of the plurality of communication systems over the plurality of RF signals via at least one repeater device, such as the second repeater device 304B in this case. The plurality of repeater devices, such as the first repeater device 304A and the second repeater device 304B, may not perform demodulation/re-modulation of data streams. Although, the first repeater device 104A or the second repeater device 104B acts as an access point (or small cell) that provides access to end users, such as the UE 306A and the UE 306B, and also provides coverage to end users at a propagation frequency of sub 6 GHz that is less than the 60 GHz frequency of the mmWave RF signal, all baseband/digital processing to support and maintain connections to the UE 306A and the UE 306B may be performed and managed by the central communication device 302, albeit via the second repeater device 104B. The second repeater device 304B may be configured to execute beamforming and MIMO communication (bi-directional) with the end-user devices, such as the UE 306A and the UE 306B. The second repeater device 104B may be configured to pack the content received from the UE 306A and the UE 306B and transmit upstream in 60 GHz mmWave RF signal to the central communication device 302 via the first repeater device 304A over wired mediums.

In the exemplary scenario 300, the first repeater device 304A and the second repeater device 304B may be at a distance from the central communication device 302 and the plurality of communication systems 310 that is beyond the usual communication range (e.g. usual range of 2.4 GHz Wi-Fi is approximately 40 to 50 meters indoors and 92 to 100 meters outdoors). The provisioning of the Wi-Fi signals and the Bluetooth signals in the form of the mmWave RF signal to the first repeater device 304A and the second repeater device 304B over wired mediums improves the transmission speed and data rate and reduces latency and at the same time enables each individual end-user device, such as the UE 306A to quickly and wirelessly access its data stream (almost near zero latency) over the extracted Wi-Fi signals via the second repeater device 304B. Similarly, end-user devices having Bluetooth-only capability may connect to the second repeater device 304B to access its data (meant for only the designated device) over the Bluetooth signal distributed by the second repeater device 304B. Thus, a high-performance, near zero latency, and noise-free content (e.g. data, audio, and video including 4K or 8K video) communication is achieved for an always connected experience in significantly improved data rates as compared to conventional Wi-Fi, Bluetooth, Zig-bee, or "WiGig" communication systems.

In accordance with the exemplary scenario 300, and in an exemplary implementation, the central communication device 302 may be a source node, that is "Node A", which may be configured and designed to operate at frequency f1 (e.g. 60 GHz) while end-user devices which may be also referred to as target destination nodes, such as the UE 306A and the UE 306B (also referred to as Node B and Node B') are configured and designed to operate at propagation frequency f2 (5 GHz). The conversion between these two frequencies f1 and f2 is then performed by the plurality of repeater devices (the first repeater device 104A or the second repeater device 104B) placed in between the central communication device 302 (i.e. the Node A) and the UE 306A and the UE 306B (i.e. Node B/B') for closing communication link. For example, communication links between the central communication device (i.e. the Node A) and the repeaters, such as the first repeater device 104A and the second repeater device 104B) may be established over frequency f1 (e.g., any frequency band available over the wired connection between the repeaters, such as the first repeater device 104A and the second repeater device 104B) and with available bandwidth and required propagation properties), whereas the communication link between the last repeater unit in the chain (such as the second repeater device 104B) and the end users, UEs 306A and 306B (Node B/B') may be established over frequency f2 and over a wireless RF propagation environment (e.g. Wi-Fi bands in 5 GHz, or CBRS band).

With respect to the aforementioned exemplary implementation and the exemplary scenario 300, further exemplary implementations and utilization embodiments are described. For example, in some embodiments, the first repeater device 304A may be located next (in vicinity or close proximity) to the central communication device 302 (i.e. the Node A). The second wired medium 308B between the first repeater device 104A and the second repeater device 104B may be used to transport a modulated RF waveform (e.g. a multiplexed mmWave RF signal). The second wired medium 308B may be a coaxial cable, a wiring available inside a home, or electricity wiring typically available inside a home, office, building. In some embodiments, a fiber wiring (optical fiber) may be used where modulated RF waveform is transported over a fiber link (in optical domain).

In some embodiments, the edge communication system is used to create an improved Wi-Fi network (e.g. with very low latency (e.g. near zero latency) and high data rate as compared to existing Wi-Fi network) using a combination of wired and wireless mediums. In such an embodiment, the Wi-Fi access point functionality, multiprotocol handling capability, and digital processing are provided in the central communication device 302 (i.e. Node A). The second repeater device 304B may include a distributed set of antennas (e.g. 4 antennas) that connects to the wired network (i.e. the second wired medium 308B) and may perform frequency shifting and conversion between frequency aggregation (e.g. the plurality of RF signals having different frequency may be segregated using frequency shifting) and same-frequency MIMO signaling. The end-user devices, such as a Wi-Fi device (e.g., smartphones) may be the UE 306B (i.e. the Node B') and a Bluetooth-only enabled device, such as an IoT device may be the UE 306A (i.e. the Node B). Such network architecture of the edge communication system may be used to extend the coverage and capacity of not only the Wi-Fi network, but also the Bluetooth network (and other networks of different communication protocols) by placing the second repeater device 304B in the vicinity of the Wi-Fi-enabled devices and the Bluetooth-enabled devices. In this embodiment, the repeater devices (or nodes), such as the first repeater device 304A and the second repeater device 304B, may not perform any digital processing, demodulation, or packet processing, thus such repeater devices introduce nearly zero latency to the waveforms (e.g. the mmWave RF signal), allowing the central communication device 302 (i.e. the Node A) and the end-user devices (such as the UEs 306A and 306B) to mitigate very small latencies through the cascaded repeater chains at physical (PHY) level processing and/or channel equalization.

Referring to FIG. 3, in an example, the central communication device 302 (i.e. the Node A) may transmit signals/waveforms at frequency f1 (e.g. 60 GHz or more over a coaxial cable, such as the first wired medium 308A) to the first repeater device 304A. In this configuration, first repeater device 304A may not perform any frequency conversion to another frequency. For the first repeater device 304A, the incoming and outgoing signals start within the same frequency band (i.e. f1). The second repeater device 304B may be configured to perform frequency conversion between frequency f1 (60 GHz) and frequency f2 and f3 (i.e. frequency band for wireless access to end users, such as 5 GHz band for Wi-Fi networks, 2.4 Ghz for Bluetooth, or other bands). As a result of the wired connection between the central communication device 302 and the first repeater device 304A, and further between the first repeater device 304A and the second repeater device 304B, latency is reduced to near zero, whereas the UEs 306A and 306B utilizes propagation over-the-air, enabled by operating frequency f2 (e.g., 5 GHz in case of Wi-Fi devices, or CBRS band in case of LTE/5G-NR devices), thereby providing a high-performance content communication.

In some embodiments, the disclosed edge communication system may be used to create an improved Frequency Division Duplex (FDD) networks or Time Division Duplex (TDD) networks using a combination of wired and wireless mediums. In case of FDD networks, different/non-overlapping uplink and downlink channels may be utilized between the first repeater device 304A and the second repeater device 304B. In other words, full-duplex frequency channels may be transported within the wired connection between the cascaded repeaters (e.g. the first repeater device 304A and the second repeater device 304B) to support uplink/downlink channels. In case of TDD networks, (e.g. Wi-Fi or LTE-TD, or 5G-NR-TD), either TDD or FDD signaling may be deployed across the wired connection (e.g. the second wired medium 308B) between repeaters (e.g. the first repeater device 304A and the second repeater device 304B). Moreover, TDD channels may be maintained in time-domain using a single frequency channel inside the wired connection (e.g. the second wired medium 308B). In some other embodiments, TDD slots between the second repeater device 304B and end-user devices (such as the UEs 306A and 306B) may be mapped onto two different frequency channels when transported across wired connection between the repeaters (i.e. between the first repeater device 304A and the second repeater device 304B) and further between the repeaters (i.e. the first repeater device 304A) and the central communication device 302. In some embodiments, the disclosed edge communication system and method may be applied to the FDD network, where uplink and downlink data streams may be concurrently transported over two different frequency bands. In this case, the uplink and downlink streams may utilize same physical antennas (e.g. wideband antennas), or separate/different physical antennas.

In yet another exemplary implementation, a 4-stream MIMO link may be created over an access link (represented in FIG. 3 by a bi-directional dotted arrow) between the second repeater device 304B and the end-user device, such as the UE 306A (Node B). This access link may be established over access frequency band f2 (typically in sub 6 GHz) which demonstrates improved MIMO channel properties and MIMO gain. In an example, data streams ds1, ds2, ds3, and ds4 may be four data streams obtained after MIMO coding is applied on some original/information data streams. In some embodiments, this MIMO processing may be performed in the central communication device 302. In some embodiments, the four MIMO coded streams ds1, ds2, ds3, and ds4 may be transported over the same channel (or sub-channel) within band of f2 (in this case, a wired connection between the central communication device 302, and the repeaters). In other words, these four data streams may have same center frequency and form a MIMO communication over same channel. A 4×4 antenna configuration is depicted between the second repeater device 304B and the UE 306A. it is to be understood that this is only for sake of demonstration, and any other combination of antennas and streams may be utilized.

Figure 4A:
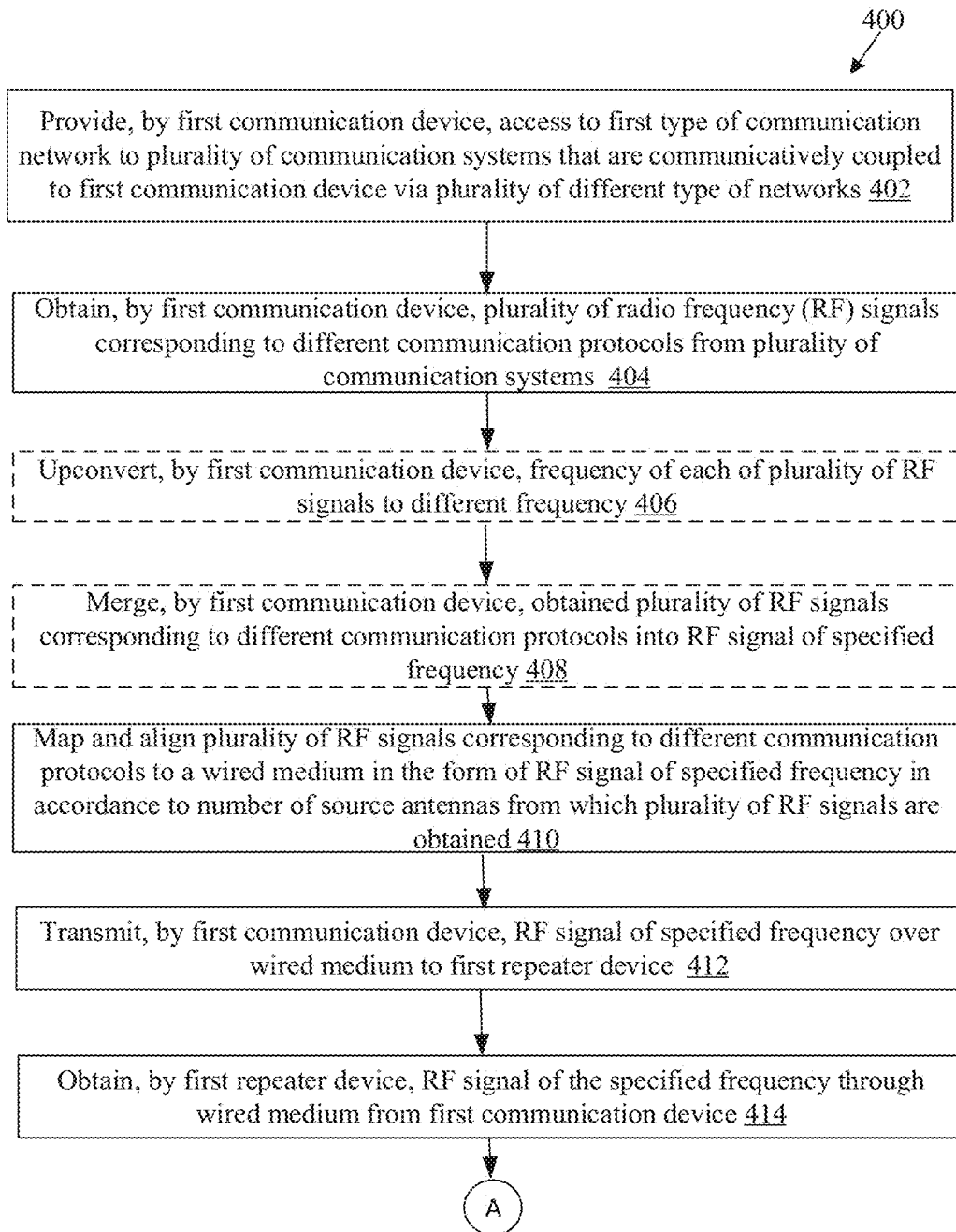
FIG. 4A and FIG. 4B, collectively, is a flowchart that illustrates an exemplary edge communication method for high performance content communication, in accordance with an embodiment of the disclosure.
Figure 4B:
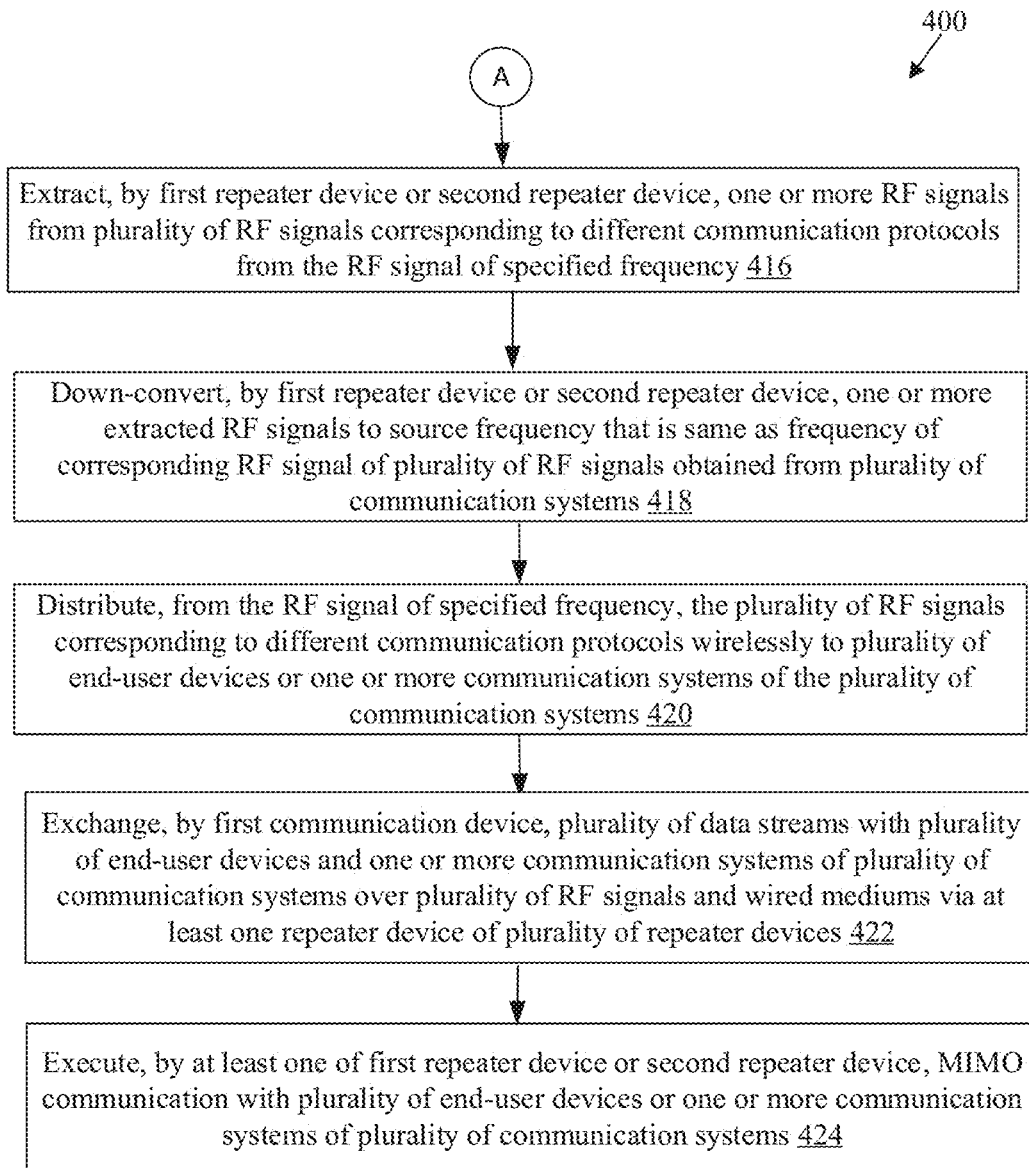

FIG. 4A and FIG. 4B, collectively, is a flowchart that illustrates an exemplary edge communication method for high performance content communication, in accordance with an embodiment of the disclosure. FIGS. 4A and 4B are explained in conjunction with elements from FIGS. 1, 2A, 2B, and 3. With reference to FIGS. 4A and 4B, there is shown a flowchart 400 comprising exemplary operations 402 through 424.

At 402, an access to the first type of communication network 108 may be provided by the first communication device 102 to the plurality of communication systems 106 that are communicatively coupled to the first communication device 102 via the plurality of different type of networks 110. The DSP 206 may be configured to provide the access to the first type of communication network to the plurality of communication systems 106.

At 404, a plurality of radio frequency (RF) signals corresponding to different communication protocols may be obtained by the first communication device 102 from the plurality of communication systems 106. The receiver circuitry 212 may be configured to obtain the plurality of radio frequency (RF) signals corresponding to different communication protocols via the plurality of different type of networks 110 (e.g. via wired or wireless networks/mediums).

At 406, a frequency of each of the plurality of RF signals may be upconverted to a different frequency by the first communication device 102. The upconverter 214 may be configured to upconvert the frequency of each of the plurality of RF signals to a different frequency.

At 408, the obtained plurality of RF signals corresponding to different communication protocols are merged into a RF signal (e.g. a mmWave signal) of a specified frequency by the first communication device 102. The multiprotocol combiner circuit 216 may be configured to multiplex the obtained plurality of RF signals corresponding to different communication protocols into the RF signal of the specified frequency.

At 410, the plurality of RF signals corresponding to different communication protocols are mapped and aligned, by the first communication device 102, to a wired medium in the form of RF signal (e.g. the mmWave signal) of the specified frequency in accordance to a number of source antennas from which the plurality of RF signals are obtained. The DSP 206 may be configured to map and align the plurality of RF signals corresponding to different communication protocols in the RF signal of the specified frequency. The RF signal of the specified frequency may be a mmWave signal of the specified frequency.

At 412, the RF signal (e.g. the mmWave signal) of the specified frequency may be transmitted, over a wired medium, to the first repeater device 104A by the first communication device 102. The transmitter circuitry 218 may be configured to transmit the RF signal (e.g. the mmWave signal) of the specified frequency, over the first wired medium 114A, to the first repeater device 104A. Each of the plurality of RF signals communicated over a corresponding type of wireless network of the plurality of different type of networks 110 has a defined communication range. The DSP 206 may be configured to extend a coverage of the plurality of RF signals corresponding to the different communication protocols beyond the defined communication range based on the transmit of the RF signal (e.g. the mmWave signal) of the specified frequency that includes the plurality of RF signals. In an implementation, the method further includes providing the RF signal (e.g. the mmWave signal) of the specified frequency, over different wired mediums, to the plurality of repeater devices 104A to 104N in a chain transmission or a parallel transmission. At least one of the merged plurality of RF signals may be extracted and further distributed at each of the plurality of repeater devices 104A to 104N.

Alternatively, the obtained plurality of RF signals corresponding to different communication protocols may be mapped and merged into a first RF signal of a first frequency (instead to merging into the RF signal (e.g. the mmWave signal) of the specified frequency) by the first communication device 102. The first RF signal of the first frequency may be transmitted, through the first wired medium 114A, to the first repeater device 104A of the plurality of repeater devices 104A to 104N. In such a case, the first RF signal of the first frequency may be upconverted to the RF signal (e.g. the mmWave signal) of the specified frequency by the first repeater device 104A. Thereafter, the RF signal (e.g. the mmWave signal) of the specified frequency may be transmitted, over the second wired medium 114B, to another repeater device, such as the second repeater device 104B.

At 414, the RF signal (e.g. the mmWave signal) of the specified frequency may be obtained through a wired medium from the first communication device 102 by the first repeater device 104A. The wired connection system 238 may be configured to obtain the transmitted RF signal (e.g. the mmWave signal) of the specified frequency over the first wired medium 114A.

At 416, one or more RF signals may be extracted (i.e. retrieve) by the first repeater device 104A or the second repeater device 104B from the plurality of RF signals corresponding to different communication protocols from the RF signal (e.g. the mmWave signal) of the specified frequency obtained via the wired medium. The control circuitry 224 may be configured to extract (or retrieve) one or more RF signals corresponding to different communication protocols from the RF signal (e.g. the mmWave signal) of the specified frequency.

At 418, one or more extracted RF signals may be down converted by the first repeater device 104A or the second repeater device 104B to a source frequency that is same as the frequency of a corresponding RF signal of the plurality of RF signals obtained from the plurality of communication systems 106. The downconverter 232 may be configured to down convert one or more extracted RF signal to its original frequency.

At 420, the plurality of RF signals corresponding to different communication protocols may be wirelessly distributed, from the RF signal (e.g. the mmWave signal) of the specified frequency, to a plurality of end-user devices or one or more communication systems of the plurality of communication systems 106. In an example, the first repeater device 104A at a second location may be configured to communicate, over the second wired medium 114B, the RF signal (e.g. the mmWave signal) of the specified frequency to the second repeater device 104B at a third location of the plurality of different locations. At least a wireless wide area network (WWAN) signal, a wireless local area network (WLAN) signal, a citizens broadband radio service (CBRS) signal, a wireless personal area network (WPAN) signal, or a combination thereof that corresponds to the plurality of RF signals, may be wirelessly distributed by at least one of the first repeater device 104A or the second repeater device 104B, to a plurality of end-user devices (such as the first set of end-user devices 112A or the second set of end-user devices 112B) or one or more communication systems of the plurality of communication systems 106 when such communication systems moves within the coverage domain (range) of at least one of the first repeater device 104A or the second repeater device 104B.

At 422, a plurality of data streams may be exchanged by the first communication device 102 with the plurality of end-user devices and the one or more communication systems of the plurality of communication systems 106 over the plurality of RF signals and wired mediums via at least one repeater device of the plurality of repeater devices 104A to 104N.

At 424, multiple-input multiple-output (MIMO) communication may be executed with the plurality of end-user devices or the one or more communication systems of the plurality of communication systems 106 by at least one of the first repeater device 104A or the second repeater device 104B. The MIMO communication may be executed at a sub 6 gigahertz (GHz) frequency that is less than the specified frequency of the RF signal (e.g. the mmWave signal).

Figure 5:
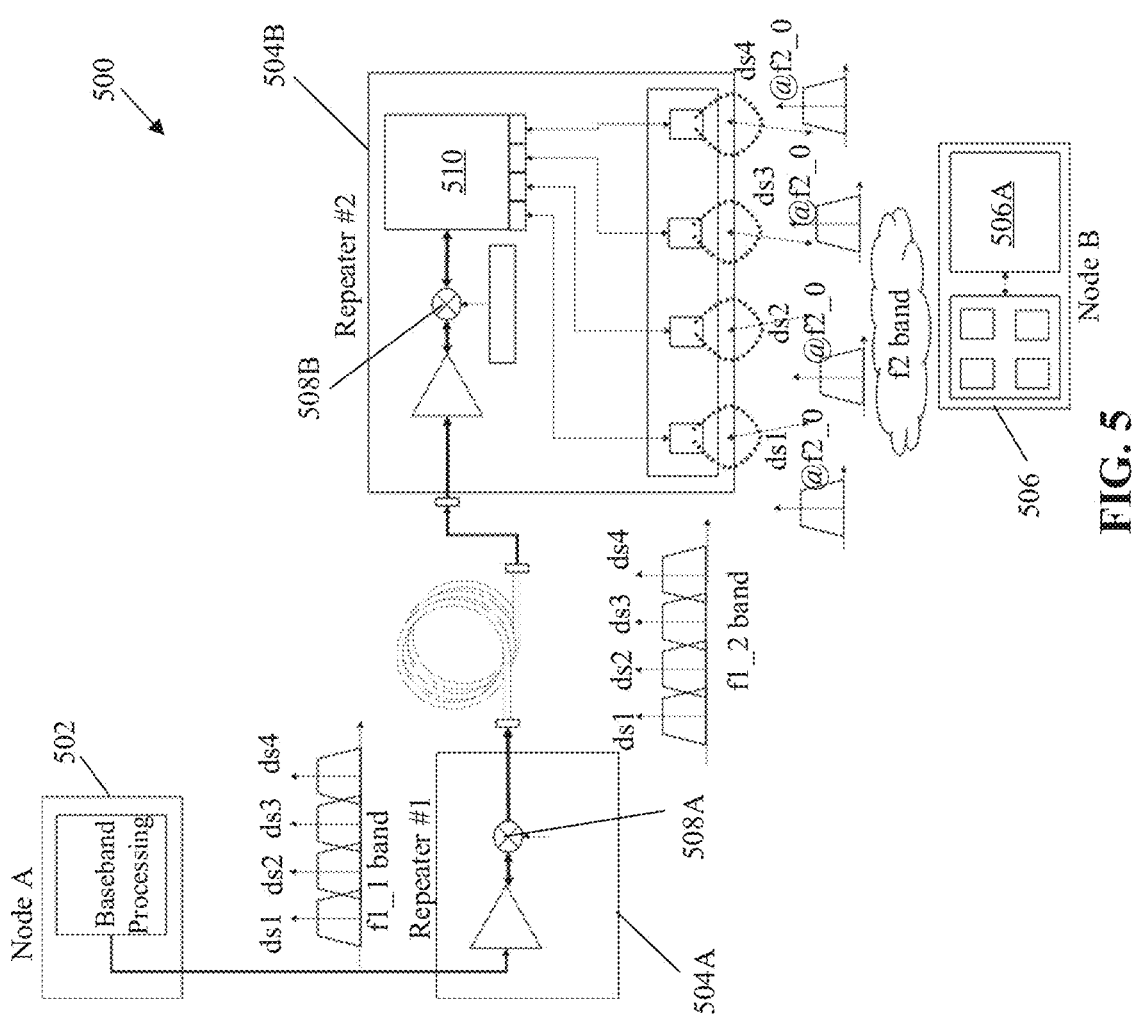
FIG. 5 is a diagram illustrating an exemplary scenario of implementation of an edge communication system with cascaded repeater devices over wired medium, in accordance with another exemplary embodiment of the disclosure.

FIG. 5 is a diagram illustrating an exemplary scenario of implementation of an edge communication system with cascaded repeater devices over wired medium, in accordance with another exemplary embodiment of the disclosure. FIG. 5 is explained in conjunction with elements from FIGS. 1, 2A, 2B, 3, 4A, and 4B. With reference to FIG. 5, there is shown an exemplary scenario 500 of an edge communication system that include a communication device 502 (i.e. a network node also represented as Node A), a plurality of cascaded repeater devices, such as a first repeater device 504A and a second repeater device 504B, and an end user device 506 (also represented as Node B). In this embodiment, there is shown an access repeater (i.e. the second repeater device 504B in this case) with MIMO support. There is also shown down/up converters 508A and 508B (which are similar to that of the downconverter 232 and the upconverter 234 of FIG. 2B).

For the sake of discussion, the repeater device connecting to the destination or end users (such as the end user device 506 (Node B) is referred to as "Access Repeater". This is to indicate that the second repeater device 504B (also represented as Repeater #2) acts as the last of repeater devices and provides access to end users at access frequency of f2. Alternatively, repeaters that close the link in between the source node, such as the communication device 502 (Node A) and final/access repeater is referred to as "Backhaul Repeater". Moreover, in the exemplary scenario 500, the communication device 502 corresponds to the first communication device 102 (FIG. 1) and the repeater devices 504A and 504B correspond to the plurality of repeater devices 104A to 104N.

In some embodiments, the "Access Repeater" as defined, is designed and provisioned to support multi-input multi-output (MIMO) operation between the second repeater device 504B and the end user device 506 (Node B, such as a user equipment), where this MIMO communication is conducted at frequency f2 over the air radio frequency (RF) propagation. This mode of operation is beneficial and advantageous, given that the propagation at lower frequency f2 (which is lower than frequency f1) results in rich scattering channel response, which leads to better MIMO capacity and MIMO performance.

In the exemplary scenario 500, a 4-stream (ds1 to ds4) MIMO link is created over an access link between the second repeater device 504B (i.e. the access repeater) and the end user device 506 (Node B). This link is established over access frequency band f2 (typically in sub 6 GHz) which demonstrates good MIMO channel properties and MIMO gain. In this example, the data streams ds1, ds2, ds3, and ds4 represent the four data streams after MIMO coding is applied on some original/information data streams. In some embodiments, this MIMO processing is performed in a digital unit (such as a digital signal processor) in the communication device 502 (Node A).

In some implementations, the four MIMO codes data streams ds1, ds2, ds3, ds4 are transported over the same channel (or sub-channel) within band of f2 (in this case, a wired connection between the communication device 502 (Node A), and the repeater devices 504A and 504B (repeaters #1 and #2). In other words, these 4 data streams would have same center frequency and form a MIMO communication over same channel. A 4×4 antenna configuration is depicted between the second repeater device 504B (Repeater #2) and the end user device 506 (4 transmit at the second repeater device 504B (Repeater #2) and 4 receive at the end user device 506 (Node B)). This is only for sake of demonstration, and any other combination of antennas and data streams may be utilized.

In some implementations, the second repeater device 504B (i.e. the access repeater or Repeater #2), performs following functions: A) down-converting (using the down/up converters 508B) the signals received through the first repeater device 504A (Repeater #1) at frequency f1 band to an access frequency band (access band) of f2; B) Receiving the four data streams ds1, ds2, ds3, ds4 (aggregated in frequency domain within band f1), and dis-aggregating them in operation 510 (through channel selection filtering and other steps needed), to transmit the four data streams over the same frequency channel inside band f2, each stream radiating through one of the antenna elements from the second repeater device 504B (Repeater #2). The operation 510 also includes frequency shifting, Mux, and Demux operations in addition to the channel selection and filtering.

In some implementations, the four streams ds1, ds2, ds3, ds4 arrive at the access repeater (i.e. the second repeater device 504B) at four different channels within f1 frequency band, for example, ds1 arrive at channel f1_2_A, ds2 arrive at channel f1_2_B, ds3 arrive at channel f1_2_C, and ds4 arrive at channel f1_2_D. These four data streams are then transported over same channel, denoted as {@f2_0), to create a MIMO link between the access repeater (i.e. the second repeater device 504B) and the end user device 506 (Node B).

In some implementations, the MIMO processing operation 506A for the end user device 506 (Node B) is done locally inside the end user device 506 (Node B), as is typically done by a User Equipment (in a cellular network). Additionally, the MIMO processing for network side of link is performed inside the communication device 502 (Node A). In this case, no MIMO processing is performed by any of the repeater devices 504A and 504B between the communication device 502 (Node A) and the end user device 506 (Node B). In the case of MIMO processing (including any MIMO pre-coding, MIMO decoding) being performed centrally inside the communication device 502 (Node A), it includes both downlink MIMO processing (e.g., MIMO pre-coding) and uplink MIMO processing (e.g., MIMO decoding).

In some implementations, the communication device 502 (Node A) and the end user device 506 (Node B), may be configured to perform channel measurement functions that estimate the effective MIMO channel between the communication device 502 (Node A) and the end user device 506 (Node B), that would include the contributions of repeater devices in the end-to-end MIMO channel response, as well as the propagations in frequency band f2. The estimated MIMO channel responses are then used to perform MIMO pre-coding and decoding at both ends of the link, depending on direction of link.

In some implementations, the aggregation of waveforms coming out of the communication device 502 (Node A), i.e., {ds1 @f1_1_A, ds2 @f1_2_B, ds3 @f1_3_C, ds4 @f1_4_D} may take different orders (i.e. spacing). For example, some variations and configurations may include: A) the signals are placed next to each other in the frequency domain, minimizing the frequency gaps between the four waveforms in the frequency domain, B) the signals are placed with some gap/guard interval in between to ease the selection filtering needed to select and disaggregate these waveforms, C) if a large amount of spectrum is available over the wired connection, these four waveforms are placed with large gaps in between. The configuration C) listed above is utilized for purpose of minimizing sensitivity/degradation due to other interfering signals operating in the f1 band. Furthermore, assume the case, where the waveforms ds1, ds2, ds3, ds4 each occupy 400 MHz spectrum. Packing all four streams next to each other in frequency domain would occupy a bandwidth of ~1.6 GHz. In this case, appearance if a wideband interfering signal would impact/overlap with all the four data streams at same time, and hence likely disrupting the link. In some embodiments, data streams ds1, ds2, ds3, ds4 may be placed in frequency domain with ~1 GHz gap in between adjacent streams. In such a case, presence/appearance of a wideband interfering signal would only overlap/impact one out of four streams. Given the MIMO and channel coding applied on the four streams, there is a much higher probability the original information stream can be recovered at the receiver, given the redundancy in the correction capability embedded into the streams being transmitted over the air.

In some implementations, a multi-stream gain adjustment or equalization is applied on the four data streams ds1, ds2, ds3, ds4 throughout the chain of repeater devices, such as the first repeater device 504A and the second repeater device 504B. This relative gain adjustment may be applied in one or the plurality of repeater devices. This gain adjustments may be applied on the incoming waveforms/streams or outgoing waveforms/streams. This relative gain adjustment and equalization may be applied for different purposes and/or due to different conditions, including (but not limited to):

A) to compensate for gain imbalances throughout the repeater chain. For example, if data stream ds1 experiences some gain attenuation or dispersion due to its center frequency, its power would be adjusted or recovered to same level as other adjacent waveforms. This may be performed to prevent the out-of-channel radiation or leakage levels of one of the data streams to overwhelm and/or degrade the signal quality of another of the streams with lower absolute power level; and B) to compensate for gain imbalance between the streams due to propagation differences they experience over frequency band f2, for links between the second repeater device 504B (Repeater #2) and the end user device 506 (Node B). For example, data streams received by different antennas of the second repeater device 504B (Repeater #2) during uplink (the end user device 506 (Node B) towards the communication device 502 (Node A)), may have very different relative signals levels. Aggregating these received signals next to each other in the frequency domain, would degrade the signal quality of weaker signals, due to leakage of out-of-band emissions of stronger signals. To address this issue, some relative gain equalization may be applied inside the second repeater device 504B before aggregating the four data streams and sending them up towards the first repeater device 504A (Repeater #1). In some embodiments, the relative gain values are coordinated, or shared with, or set by the communication device 502 (Node A). This is to enable the baseband processing (MIMO pre-coding, decoding) to take into this gain adjustment (which is not part of actual channel propagation between the second repeater device 504B and the end user device 506 (Node B)) in their MIMO processing.

Figure 6:
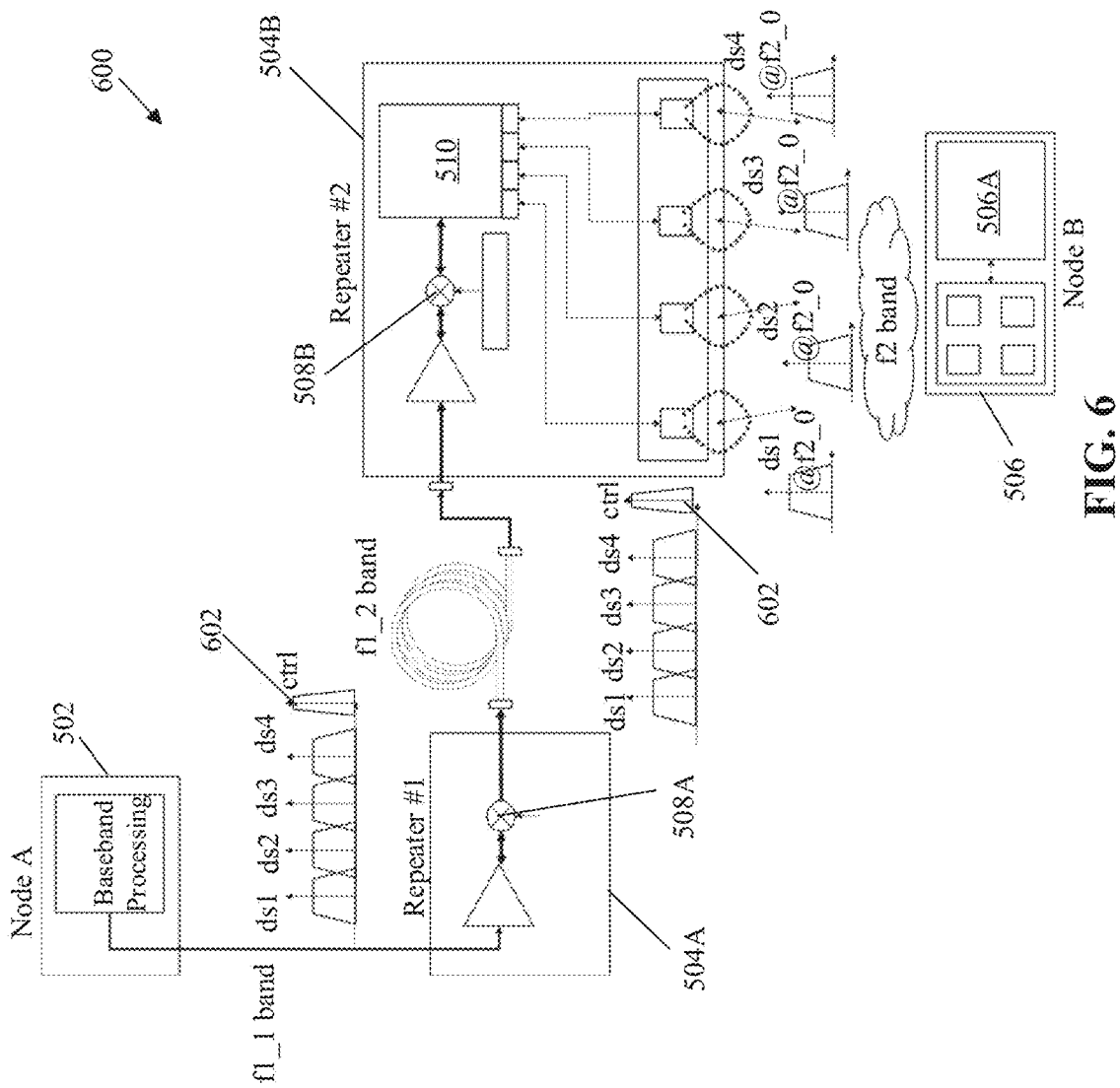
FIG. 6 is a diagram illustrating an exemplary scenario of implementation of an edge communication system with cascaded repeater devices over wired medium, in accordance with yet another exemplary embodiment of the disclosure.

FIG. 6 is a diagram illustrating an exemplary scenario of implementation of an edge communication system with cascaded repeater devices over wired medium, in accordance with yet another exemplary embodiment of the disclosure. FIG. 6 is explained in conjunction with elements from FIG. 5. With reference to FIG. 6, there is shown an exemplary scenario 600 that illustrates the exemplary scenario 500 (of FIG. 5) with an embedded control channel 602.

In some embodiments, a control channel 602 may be established between the communication device 502 (Node A) and the repeater devices in a network. This control channel 602 may be used for configuring various settings within the repeater devices (e.g., frequency settings for various clock/mixers, gain adjustments, time allocations for uplink/downlink, number/set of MIMO streams allocated to a repeater device, frequency channels within bands f1 and f2 allocated/utilized). This control channel 602 may be utilized for monitoring purposes and collecting various status and metrics data from the repeater devices, such as the first repeater device 504A and the second repeater device 504B, back to the communication device 502 (Node A). In some implementations, in-band control channel may be used for control purposes (embedded control signals into one of data streams ds1, ds2, ds3, ds4), or an out-of-band control channel may be utilized over a dedicated and available channel (also shown as "ctrl" at channel f1_1_E).

Figure 7:
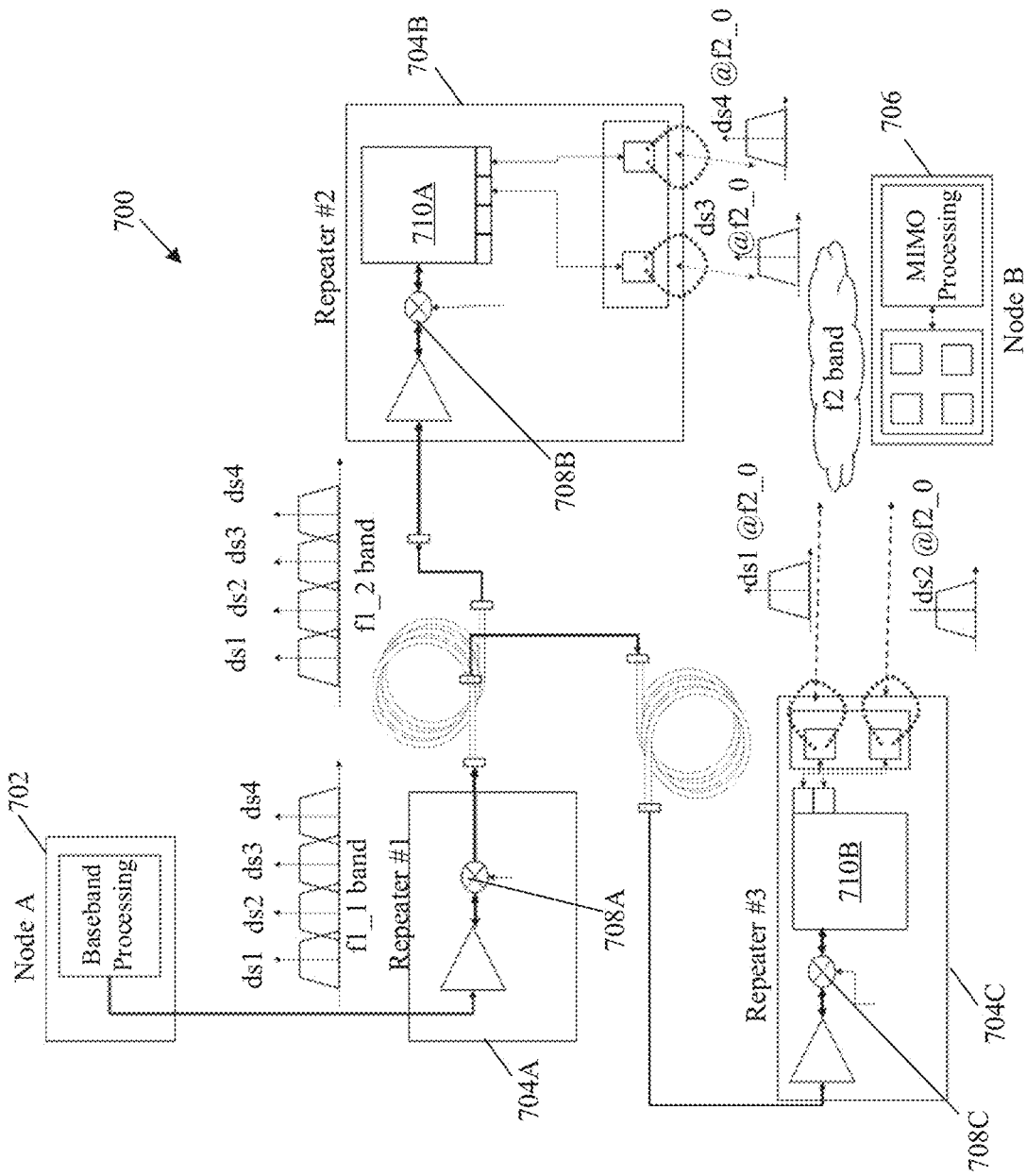
FIG. 7 is a diagram illustrating an exemplary scenario of implementation of an edge communication system with cascaded repeater devices over wired medium, in accordance with another exemplary embodiment of the disclosure.

FIG. 7 is a diagram illustrating an exemplary scenario of implementation of an edge communication system with cascaded repeater devices over wired medium, in accordance with yet another exemplary embodiment of the disclosure. FIG. 7 is explained in conjunction with elements from FIGS. 1, 2A, 2B, 3, 4A, 4B, 5 and 6. With reference to FIG. 7, there is shown an exemplary scenario 700 of an edge communication system that include a communication device 602 (i.e. a network node also represented as Node A), a plurality of repeater devices (such as a first repeater device 704A, a second repeater device 704B, and a third repeater device 704C), and an end user device 706 (also represented as Node B). In this embodiment, there is shown multiple access repeaters (i.e. the second repeater device 704B and the third repeater device 704C) with distributed MIMO support. In the FIG. 7, multiple access repeater devices provide access to the end user device 706 (Node B) by transporting multiple data streams simultaneously and over same frequency channel to the end user device 706 (i.e. Node B). Moreover, in the exemplary scenario 700, the communication device 702 corresponds to the first communication device 102 (FIG. 1) and the repeater devices 704A, 704B, and 704C correspond to the plurality of repeater devices 104A to 104N (FIG. 1). There is also shown down/up converters 708A, 708B, and 708C in the corresponding repeater devices (which are similar to that of the downconverter 232 and the upconverter 234 of FIG. 2B). The operation 710A and 710B at each corresponding repeater device refers to operations, such as channel selection and filtering, frequency shifting, Mux, and Demux operations.

In an implementation, the two access repeater devices (i.e. the second repeater device 704B and the third repeater device 704C) provide links to the end user device 706 (Node B) in frequency band f2 over air. On the other hand, incoming (i.e. downlink) signals may be transported to the access repeater devices (i.e. the second repeater device 704B and the third repeater device 704C) over a frequency band across a wired connection (e.g., band f1) (wired connection is represented by thick lines among the communication device 702 and the repeater devices). In some implementations, the second repeater device 704B and the third repeater device 704C (i.e. repeaters #2 and #3) may be placed in different rooms in a house and connected to wired coaxial drops available inside each room. In such an implementation, the first repeater device 704A (repeater #1) may be placed in proximity to the communication device 702 (i.e. next to node A as a central Wi-Fi access point), where the communication device 702 (node A) is communicatively coupled and next to an internet gateway of the house. The coaxial connection network between the repeater devices #1,2,3 may take any topology (star, ring, etc.) with various splitters and combiners in the wiring network.

In some implementation, the access repeater devices (i.e. the second repeater device 704B and the third repeater device 704C) may receive their respective signals from same repeaters (e.g., the same first repeater device 704A as shown in the FIG. 7), or the access repeater devices may establish their connections to the communication device 702 (Node A) through different repeater devices in the plurality of repeater devices deployed. Distributed MIMO communication may be established between the communication device 702 (i.e. Node A as source node) and the end user device 706 (Node B as a destination node), where combination of MIMO channels between the second repeater device 704B (Repeater #2) and the end user device 706 (Node B), and between the third repeater device 704C (Repeater #3) and the end user device 706 (Node B), forms a MIMO channel with larger dimensions. In the example shown in the FIG. 7, each channel is a 2×4 MIMO link, where superset of these channels, constructs an effective 4×4 MIMO link.

In some implementations, all baseband, MIMO, and/or digital processing (such as MIMO pre-coding, decoding) on network side is performed centrally inside the communication device 702 (or in a virtualized Node B). In this case, the repeater devices #1, #2, #3 do not perform or apply any digital processing on the data streams, resulting in nearly zero latency through the network of repeater devices.

In some implementations, a plurality of repeater devices with {f1-in, f1-out} configuration may be utilized to extend the range of coverage for the communication device 702 (Node A). For example, the first repeater device 704A (repeater #1) may be replaced by a mesh of repeaters that take in signals in band f1 and transmit over in band f1 (e.g., mesh of repeaters operating in band f1).

In some implementations, and for the first repeater device 704A (repeater #1), where incoming/outgoing frequencies operate in same frequency band, certain techniques may be used to mitigate self-interference, for example, by allocating non-overlapping channels (or sub-channels) within the band f1.

In some implementations, the access repeater devices (i.e. the second repeater device 704B and the third repeater device 704C) may be configured to select and re-propagate same data streams. For example, both the access repeater devices (i.e. the second repeater device 704B and the third repeater device 704C) may re-propagate data streams ds1 and ds2. In this case, the end user device 706 (Node B) may see a 2×MIMO signaling. This mode may be utilized to extend the coverage and reliability of the access link. In this mode, no MAC/network level handoff is required when the end user device 706 (Node B) transitions from coverage domain of the second repeater device 704B into coverage domain of the third repeater device 704C. This creates better coverage with no handoff required, and connection is maintained at PHY-level when the end user device (i.e. Node B) moves between the coverage domain of the second repeater device 704B and the third repeater device 704C (i.e. repeaters #2 and #3).

In some implementations, the access repeater devices (i.e. the second repeater device 704B and the third repeater device 704C) may be configured by the end user device 706 (Node B) to select different data streams. In this case, the access repeater devices operate as sub-segments of a distributed MIMO system, where the end user device 706 experience a 4×MIMO signaling, where 2× is through the second repeater device 704B (repeater #2) and another 2× is through the third repeater device 704C (repeater #3). In this case, no explicit handoff may be required when the end user device 706 (node B) moves from coverage of the second repeater device 704B (repeater #2) into the third repeater device 704C (repeater #3). This is enabled by the fact the 4×4 MIMO channel estimation between the end user device 706 (node B) and the communication device 702 (i.e. node A), may implicitly capture the effect of fading or weak connection between the second repeater device 704B (repeater #2) and the end user device 706 (node B), and may start loading less (or eventually remove) MIMO data streams allocated to two antennas inside the second repeater device 704B (repeater #2).

It is to be understood that the various implementation described above can be combined or only a subset of the various implementations can be combined in a system without limiting the scope of the disclosure. Moreover, the FIG. 7 is described taking an example of one end user device, however, various other deployment scenarios may be possible with multiple user devices, such as access multi-repeaters with distributed multi-user MIMO support. For example, in some implementations, multiple end user devices (e.g., Node B/B') may be supported by a plurality of access repeater devices that may provide propagation coverage to end user devices, such as Node B/B'. In some implementations, the data streams generated and originated at the communication device 702 (Node A) may include data for both the end user devices (Node B/B, e.g., multiplexed in frequency using OFDMA method). In some implementations, the communication device 702 (i.e. Node A) may generate data streams ds1, ds2, ds3, ds4, to form a multi-user MIMO communication link between the antennas of the second repeater device 704B and the third repeater device 704C (repeaters #2 and #3) and the end user devices (Node B and node B'). In some implementations, resource blocks (sub-carriers according to OFDMA protocol) within the data streams ds1, ds2, ds3, ds4 may be assigned to each end user devices (e.g., Node B/B'). In this case, both end user devices (Node B and node B') may be concurrently serviced in same frequency band/channel and in same frame/slot.

Other Systems and Methods Implementations

In some exemplary implementations, the various implementations described in FIGS. 1 to 7, may be applied to a Frequency Division Duplexing (FDD) system where uplink and downlink streams are concurrently transported over two different frequency bands. In this case, the uplink and downlink streams may utilize same physical antennas (wideband antennas), or separate/different physical antennas.

In some implementations, the repeater devices (such as first repeater device 704A, the second repeater device 704B, and the third repeater device 704C) may have internal circuitry, blocks, function to detect the time-division duplexing (TDD) slot allocations for uplink/downlink. This is then used for switching ON/OFF and direction of blocks with each repeater device based on direction of links for a given time slot. In some cases, the assignment of time slots for TDD uplink/downlink may be communicated to the repeater devices over a control channel/plane, where this control plane may be an out-of-band channel (such as a low data rate LTE link or a control channel over wired connections), or in-band control channel embedded into the streams traveling through the cascaded repeater devices over wired medium.

In some implementation, the access repeaters (such as the second repeater device 704B and the third repeater device 704C) providing access to end user devices (Node B and B') in lower frequency band) may form a "Distributed Antenna System (DAS)", where multiple access repeaters provide signals to end user devices. In some implementation, same end user device may be receiving MIMO signal streams, concurrently from multiple access repeaters. In some implementation, the MIMO streams transmitted by multiple of access repeaters for a distributed/coordinated MIMO access, where the individual MIMO streams transmitted by distributed access repeaters may be centrally (or jointly) generated/coded in the base stations (e.g., Node A).

In some implementation, frequency allocation coordination may be utilized over the links between an end user device (Node B), repeater devices and in between repeater devices, to mitigate/minimize interference between the links within band f1. This coordination may be performed by a DSP and engines (such as the DSP 206) inside the communication device (Node A), by collecting and analyzing a subset of information about deployment locations/orientation of repeater devices, and signal or interference power measurements conducted or reported by the repeater devices. For example, links with high level of cross-leakage in band f1, would be allocated non-overlapping channels within band f1. In other cases, beam pattern optimization methods may be used to mitigate interference between links, through creating nulling or rejection regions within the beam patterns of antenna arrays of the repeater devices.

In some implementation, no hard or explicit handoff may be utilized when an end user device (e.g., Node B) enters or exist the coverage region of an access repeater. The end user (Node B), may implicitly (seamlessly) be transitioning from the propagation coverage of one access repeater device into another access repeater device's coverage region, or into the Node A's direct coverage. Since all the signal processing is done centrally inside Node A, the transition from one access repeater domain into another repeater access's domain doesn't require any handoff process or special user management services.

In some implementation, OFDMA waveforms and protocols may be used by Node A, to support multiple end user devices (UEs, Node B and B') over same time slot and frequency channel, as a means of multiple access mechanism. In other embodiments, TDD and FDD signaling may be utilized.

In some implementations, each access repeater may only contain one radiating element in band f2, transmitting signal to Node B. In this case, each access repeater may operate as one antenna in plurality of antennas needed for MIMO communication to end user Node B, where other access repeaters each act as other antenna elements of the MIMO system. In this, the MIMO streams for all these individual elements inside access repeaters may be generated/coded centrally inside Node B.

In some implementations, adjacent access repeaters (operating in band f2), may each be allocated non-overlapping portions of a band. This allows the adjacent access repeaters covering end users, deliver traffic and data streams over different sub-channels. This mode of operation allows for cellular-like partitioning of coverage for each access repeater. This allows for frequency reuse, across a network of access repeaters, by alternately allocating non-overlapping frequency sub-channels to adjacent access repeaters (or cells). In some implementation, this allocation and coordination of frequency sub-channels to access repeaters are managed by the Node A.

In some implementations, the communication device 702 (Node A) may use communication system and methods according to 3GPP standards and specifications. For example, Node A may act as an eNB per LTE (EUTRA) specifications under 3GPP, and end user devices (Node B/B') may be two User Equipment (UEs). In some embodiments, the communication device 702 (Node A) may use specifications per New Radio (NR) system defined under 3GPP (also known as 5G NR). In this case Node A operate as gNB per 5G NR specifications. In some other implementations, the communication device 702 (Node A) may use specifications per various versions of IEEE 802.11 standard (e.g., 802.11ac, 802.11ax, etc). In this case, the communication device 702 (Node A) may act as an access point per 802.11 specifications and devices Node B/B act as STAs under 802.11 specifications.

In some implementations, the access repeaters (repeaters #2 and #3) may be configured to propagate waveforms corresponding to the same SSID (service set identifier). In this case, no SSID handoff is required when node B transitions from repeater #2 coverage domain onto repeater #3 coverage. In some embodiment, node A may allocate streams to repeaters #2 and repeaters 32, such that the waveforms assigned to each repeater would operate each repeater as part of a different SSID. In some embodiments, node A may configure each access repeater to propagate its associated waveforms over a different channel within the band. For example, repeater #2 may effectively operate in channel #N of WiFi's 5 GHz band, where repeater #2 may effectively operate in channel #M of WiFi's 5 GHz band.

In some implementations, the end user device 706 (i.e. Node B) may dynamically re-configure the settings of access repeaters, such as their associated SSIDs or the access frequency channels assigned to each repeater (e.g., WiFi channel within 5 GHz band). Such dynamic re-configuration may be triggered/set by a plurality of factors: 1) capacity demand/requirements, 2) quality service or reliability requirements, 3) cross-interference measurements between coverage areas of access repeaters, 4) distributed MIMO capacity measurements for devices throughout the coverage area, 5) interference measurements over different channels within the access band (e.g., WiFi 5 GHz band).

In some implementations, the end user device 706 (i.e. Node B) may assume different carrier frequency offset (and/or data sampling offset) on different data streams. In this case, the modem inside node B would be estimating different values for frequency offset (and do not assume/average frequency offset estimates across all streams), and applying different correction values for different streams based on grouping of streams per repeater. Such method is utilized to mitigate the fact that different streams transporting through different access repeaters may experience different local oscillator frequency offset.

Various embodiments of the disclosure may provide a non-transitory computer-readable medium having stored thereon, computer implemented instructions that when executed by a computer causes a communication apparatus to execute operations, the operations comprising obtaining, by at least one repeater device (of the plurality of repeater devices 104A to 104N), a mmWave RF signal of a specified frequency through a wired medium from the first communication device 102, where the mmWave RF signal comprises a plurality of radio frequency (RF) signals corresponding to different communication protocols obtained from the plurality of communication systems 106 by the first communication device 102. The operations further comprising distributing, from the obtained mmWave RF signal, the plurality of RF signals corresponding to different communication protocols wirelessly to a plurality of end-user devices or one or more communication systems of the plurality of communication systems 106.

Various embodiments of the disclosure may provide the edge communication system 100 (FIG. 1). The edge communication system 100 includes the first communication device 102 (FIG. 1) at a first location, where the first communication device 102 includes a digital signal processor (such as the DSP 206) that is configured to obtain a plurality of radio frequency (RF) signals corresponding to different communication protocols from the plurality of communication systems 106. The edge communication system 100 further includes the plurality of repeater devices 104A to 104N arranged at a plurality of different locations and are communicatively coupled in a cascaded structure over wired mediums, where at least one repeater device of the plurality of repeater devices 104A to 104N is arranged at a second location of the plurality of different locations, and where the at least one repeater device is configured to obtain a RF signal of a specified frequency through a wired medium (e.g. the first wired medium 114A) from the first communication device 102; and distribute, from the obtained RF signal of the specified frequency, the plurality of radio frequency (RF) signals corresponding to different communication protocols wirelessly to a plurality of end-user devices or one or more communication systems of the plurality of communication systems 106.

In accordance with an embodiment, the RF signal of the specified frequency is a mmWave signal.

In accordance with an embodiment, the plurality of radio frequency (RF) signals correspond to a citizens broadband radio service (CBRS) signal, a wireless wide area network (WWAN) signal, a wireless local area network (WLAN) signal, a wireless personal area network (WPAN) signal, or a combination thereof, and where a frequency of each of the plurality of RF signals is less than the specified frequency of the mmWave RF signal. The DSP 206 of the first communication device 102 may be further configured to provide access to the first type of communication network 108 to the plurality of communication systems 106 that are communicatively coupled to the first communication device 102 directly via a plurality of different type of networks 110 or via the plurality of repeater devices 104A to 104N. The DSP 206 of the first communication device 102 may be further configured to merge the obtained plurality of RF signals corresponding to different communication protocols into the RF signal of the specified frequency; and transmit, through the wired medium, the mmWave RF signal of the specified frequency to the at least one repeater device, or through the first wired medium 114A to the first repeater device 104A that further transfers the RF signal (e.g. a mmWave RF signal) of the specified frequency to the at least one repeater device (e.g. the second repeater device 104B).

In accordance with an alternative embodiment, the DSP 206 of the first communication device 102 may be further configured to map and merge the obtained plurality of RF signals corresponding to different communication protocols into a first RF signal of a first frequency; and transmit, through the first wired medium 114A, the first RF signal of the first frequency to the first repeater device 104A of the plurality of repeater devices 104A to 104N. The first repeater device 104A of the plurality of repeater devices 104A to 104N may be further configured to upconvert the first RF signal of the first frequency to the RF signal of the specified frequency; and transmit, over the second wired medium 114B, the RF signal of the specified frequency to the at least one repeater device (such as the second repeater device 104B).

In accordance with an embodiment, the DSP 206 of the first communication device 102 may be further configured to exchange a plurality of data streams with the plurality of end-user devices and the one or more communication systems of the plurality of communication systems over the plurality of radio frequency (RF) signals via the at least one repeater device. The at least one repeater device is further configured to execute multiple-input multiple-output (MIMO) communication with the plurality of end-user devices or the one or more communication systems of the plurality of communication systems, wherein the MIMO communication is executed at a sub 6 gigahertz (GHz) frequency that is less than the specified frequency of the RF signal (e.g. a mmWave RF signal) of the specified frequency. The different communication protocols correspond to a Wireless-Fidelity (Wi-Fi) protocol, a Bluetooth Protocol, a Bluetooth low energy (BLE) protocol, a Zigbee protocol, a cellular communication protocol, an infrared communication protocol, a radio frequency for consumer electronics (RF4CE) protocol, a wireless sensor network protocol, or different variations of wireless wide area network (WWAN), wireless local area network (WLAN), a citizens broadband radio service (CBRS) protocol, or wireless personal area network (WPAN) protocols. The specified frequency of the RF signal (e.g. a mmWave RF signal) is in the range of 55 gigahertz (GHz) to 65 GHz. Alternatively, the specified frequency of the RF signal is 60 gigahertz (GHz).

Various embodiments of the disclosure may provide the edge communication system 100 (FIG. 1). The edge communication system 100 includes the first communication device 102 (FIG. 1) at a first location and a plurality of repeater devices that are arranged at a plurality of different locations and are communicatively coupled in a cascaded structure over wired mediums, where the first communication device 102 comprises the DSP 206 that is configured to obtain a plurality of radio frequency (RF) signals corresponding to different communication protocols from the plurality of communication systems 106. The DSP 206 may be further configured to merge the obtained plurality of RF signals corresponding to different communication protocols into a RF signal (e.g. a mmWave RF signal) of a specified frequency; and transmit, through the first wired medium 114A, the RF signal of the specified frequency to the first repeater device 104A of the plurality of repeater devices 104A to 104N. The first repeater device 104A at a second location may be configured to communicate, over the second wired medium 114B, the RF signal (e.g. a mmWave RF signal) of the specified frequency to the second repeater device 104B at a third location of the plurality of different locations, and where at least one of the first repeater device 104A or the second repeater device 104B may be configured to distribute, from the RF signal of the specified frequency, a wireless wide area network (WWAN) signal, a wireless local area network (WLAN) signal, a citizens broadband radio service (CBRS) signal, a wireless personal area network (WPAN) signal, or a combination thereof that corresponds to the plurality of RF signals, wirelessly to a plurality of end-user devices or one or more communication systems of the plurality of communication systems 106.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

What is claimed is:
1. A communication system, comprising:
a first communication device at a first location, wherein the first communication device comprises a digital signal processor that is configured to obtain a plurality of radio frequency (RF) signals from a plurality of communication systems associated with a plurality of different types of communication network, wherein the plurality of RF signals corresponds to different communication protocols, and wherein each of the plurality of RF signals is communicated over a corresponding type of communication network of the plurality of different type of communication networks, wherein each communication network of the plurality of different type of communication networks has a defined communication range; and
a plurality of repeater devices arranged at a plurality of different locations and are communicatively coupled in a cascaded structure over wired mediums,
wherein at least one repeater device of the plurality of repeater devices is arranged at a second location of the plurality of different locations, and wherein the at least one repeater device is configured to:
obtain a RF signal of a specified frequency through a wired medium from the first communication device; and
distribute, from the obtained RF signal of the specified frequency, the plurality of radio frequency (RF) signals corresponding to different communication protocols wirelessly to a plurality of end-user devices or one or more communication systems of the plurality of communication systems.
2. The communication system according to claim 1, wherein the plurality of radio frequency (RF) signals correspond to a citizens broadband radio service (CBRS) signal, a wireless wide area network (WWAN) signal, a wireless local area network (WLAN) signal, a wireless personal area network (WPAN) signal, or a combination thereof, and wherein a frequency of each of the plurality of RF signals is less than the specified frequency of the RF signal.
3. The communication system according to claim 1, wherein the digital signal processor of the first communication device is further configured to provide access to a first type of communication network to the plurality of communication systems that are communicatively coupled to the first communication device directly via a plurality of different type of networks or via the plurality of repeater devices.
4. The communication system according to claim 1, wherein the digital signal processor of the first communication device is further configured to:
merge the obtained plurality of RF signals corresponding to the different communication protocols into the RF signal of the specified frequency; and
transmit, through a wired medium, the RF signal of the specified frequency to the at least one repeater device, or through a first wired medium to a first repeater device that further transfers the RF signal of the specified frequency to the at least one repeater device.
5. The communication system according to claim 1, wherein the digital signal processor of the first communication device is further configured to:

map and merge the obtained plurality of RF signals corresponding to the different communication protocols into a first RF signal of a first frequency; and transmit, through a first wired medium, the first RF signal of the first frequency to a first repeater device of the plurality of repeater devices.

6. The communication system according to claim 5, wherein the first repeater device of the plurality of repeater devices is further configured to:

upconvert the first RF signal of the first frequency to the RF signal of the specified frequency; and transmit, over a second wired medium, the RF signal of the specified frequency to the at least one repeater device.

7. The communication system according to claim 1, wherein the digital signal processor of the first communication device is further configured to exchange a plurality of data streams with the plurality of end-user devices and the one or more communication systems of the plurality of communication systems over the plurality of radio frequency (RF) signals via the at least one repeater device.

8. The communication system according to claim 1, wherein the at least one repeater device is further configured to execute multiple-input multiple-output (MIMO) communication with the plurality of end-user devices or the one or more communication systems of the plurality of communication systems, wherein the MIMO communication is executed at a sub 6 gigahertz (GHz) frequency that is less than the specified frequency of the RF signal, which is a mmWave RF signal.

9. The communication system according to claim 1, wherein the different communication protocols correspond to a Wireless-Fidelity (Wi-Fi) protocol, a Bluetooth Protocol, a Bluetooth low energy (BLE) protocol, a Zigbee protocol, a cellular communication protocol, an infrared communication protocol, a radio frequency for consumer electronics (RF4CE) protocol, a wireless sensor network protocol, or different variations of wireless wide area network (WWAN), wireless local area network (WLAN), a citizens broadband radio service (CBRS) protocol, or wireless personal area network (WPAN) protocols.

10. The communication system according to claim 1, wherein the specified frequency of the RF signal is in the range of 55 gigahertz (GHz) to 65 GHz.

11. The communication system according to claim 1, wherein the specified frequency of the RF signal is 60 gigahertz (GHz).

12. The communication system according to claim 1, wherein the RF signal of the specified frequency is a mmWave signal.

13. The communication system according to claim 1, wherein a coverage of the plurality of RF signals corresponding to the different communication protocols is extended based on the transmission of the RF signal of the specified frequency over one or more wired mediums.

14. A communication system, comprising:

a first communication device at a first location; and a plurality of repeater devices that are arranged at a plurality of different locations and are communicatively coupled in a cascaded structure over wired mediums, wherein the first communication device comprises a digital signal processor that is configured to:

obtain a plurality of radio frequency (RF) signals from a plurality of communication systems associated with a plurality of different types of communication network, wherein the plurality of RF signals corresponds to different communication protocols, and wherein each of the plurality of RF signals is communicated over a corresponding type of communication network of the plurality of different type of communication networks, wherein each communication network of the plurality of different type of communication networks has a defined communication range;

merge the obtained plurality of RF signals corresponding to different communication protocols into a RF signal of a specified frequency; and transmit, through a first wired medium, the RF signal of the specified frequency to a first repeater device of the plurality of repeater devices, and wherein the first repeater device at a second location is configured to communicate, over a second wired medium, the RF signal of the specified frequency to a second repeater device at a third location of the plurality of different locations, and wherein at least one of the first repeater device or the second repeater device is configured to distribute, from the RF signal of the specified frequency, a wireless wide area network (WWAN) signal, a wireless local area network (WLAN) signal, a citizens broadband radio service (CBRS) signal, a wireless personal area network (WPAN) signal, or a combination thereof that corresponds to the plurality of RF signals, wirelessly to a plurality of end-user devices or one or more communication systems of the plurality of communication systems.

15. The communication system according to claim 14, wherein the digital signal processor of the first communication device is further configured to provide access to a first type of communication network to the plurality of communication systems that are communicatively coupled to the first communication device directly via a plurality of different type of networks or via the plurality of repeater devices.

16. The communication system according to claim 14, wherein the digital signal processor of the first communication device is further configured to map the plurality of RF signals corresponding to the different communication protocols to the first wired medium as the RF signal of the specified frequency, in accordance to a number of source antennas from which the plurality of RF signals is obtained.

17. The communication system according to claim 14, wherein the digital signal processor of the first communication device is further configured to exchange a plurality of data streams with the plurality of end-user devices and the one or more communication systems of the plurality of communication systems over the plurality of radio frequency (RF) signals via at least one repeater device of the plurality of repeater devices.

18. The communication system according to claim 14, wherein at least one of the first repeater device or the second repeater device is further configured to execute multiple-input multiple-output (MIMO) communication with the plurality of end-user devices or the one or more communication systems of the plurality of communication systems, wherein the MIMO communication is executed at a sub 6 gigahertz (GHz) frequency that is less than the specified frequency of the RF signal of the specified frequency, wherein the RF signal of the specified frequency is a mmWave signal.

19. The communication system according to claim 14, wherein the specified frequency of the mmWave RF signal is 60 gigahertz (GHz).

20. A method for communication, the method comprising:
obtaining, by at least one repeater device, a mmWave RF signal of a specified frequency through a wired medium from a first communication device, wherein the mmWave RF signal comprises a plurality of radio frequency (RF) signals, and wherein the plurality of RF signals corresponds to different communication protocols obtained from a plurality of communication systems by the first communication device, wherein the plurality of communication systems are associated with a plurality of different types of communication network, wherein each of the plurality of RF signals is communicated over a corresponding type of communication network of the plurality of different type of communication networks, and wherein each communication network of the plurality of different type of communication networks has a defined communication range; and
distributing, from the obtained mmWave RF signal, the plurality of radio frequency (RF) signals corresponding to different communication protocols wirelessly to a plurality of end-user devices or one or more communication systems of the plurality of communication systems.

21. A non-transitory computer-readable medium having stored therein, computer-executable code, which when executed by a digital signal processor, cause the digital signal processor to execute operations for communication, the operations for communication comprising:
obtaining, by at least one repeater device, a mmWave RF signal of a specified frequency through a wired medium from a first communication device, wherein the mmWave RF signal comprises a plurality of radio frequency (RF) signals corresponding to different communication protocols, wherein the plurality of RF signals are obtained from a plurality of communication systems by the first communication device, wherein the plurality of communication systems are associated with a plurality of different types of communication networks, wherein each of the plurality of RF signals is communicated over a corresponding type of communication network of the plurality of different type of communication networks, and wherein each communication network of the plurality of different type of communication networks has a defined communication range; and
distributing, from the obtained mmWave RF signal, the plurality of radio frequency (RF) signals corresponding to the different communication protocols wirelessly to a plurality of end-user devices or one or more communication systems of the plurality of communication systems.

22. A communication system, comprising:
a first communication device at a first location, wherein the first communication device comprises a digital signal processor that is configured to:
obtain a plurality of radio frequency (RF) signals from a plurality of communication systems, wherein the plurality of RF signals corresponds to different communication protocols,
map and merge the obtained plurality of RF signals corresponding to different communication protocols into a first RF signal of a first frequency, and
transmit, through a first wired medium, the first RF signal of the first frequency to a first repeater device of a plurality of repeater devices; and
the plurality of repeater devices arranged at a plurality of different locations and are communicatively coupled in a cascaded structure over wired mediums,
wherein the first repeater device of the plurality of repeater devices is further configured to:
upconvert the first RF signal of the first frequency to the RF signal of a specified frequency, and
transmit, over a second wired medium, the RF signal of the specified frequency to at least one repeater device,
wherein the at least one repeater device of the plurality of repeater devices is arranged at a second location of the plurality of different locations, and wherein the at least one repeater device is configured to:
obtain the RF signal of the specified frequency through a wired medium from the first repeater device, and
distribute, from the obtained RF signal of the specified frequency, the plurality of radio frequency (RF) signals corresponding to the different communication protocols wirelessly to a plurality of end-user devices or one or more communication systems of the plurality of communication systems.

23. A communication system, comprising:
a first communication device at a first location; and
a plurality of repeater devices that are arranged at a plurality of different locations and are communicatively coupled in a cascaded structure over wired mediums,
wherein the first communication device comprises a digital signal processor that is configured to:
obtain a plurality of radio frequency (RF) signals from a plurality of communication systems, wherein the plurality of RF signals corresponds to different communication protocols;
merge the obtained plurality of RF signals corresponding to different communication protocols into a RF signal of a specified frequency; and
transmit, through a first wired medium, the RF signal of the specified frequency to a first repeater device of the plurality of repeater devices,
and wherein the first repeater device at a second location is configured to communicate, over a second wired medium, the RF signal of the specified frequency to a second repeater device at a third location of the plurality of different locations,
wherein at least one of the first repeater device or the second repeater device is configured to distribute, from the RF signal of the specified frequency, a wireless wide area network (WWAN) signal, a wireless local area network (WLAN) signal, a citizens broadband radio service (CBRS) signal, a wireless personal area network (WPAN) signal, or a combination thereof that corresponds to the plurality of RF signals, wirelessly to a plurality of end-user devices or one or more communication systems of the plurality of communication systems, and
wherein the digital signal processor of the first communication device is further configured to map the plurality of RF signals corresponding to the different communication protocols to the first wired medium as the RF signal of the specified frequency, in accordance to a number of source antennas from which the plurality of RF signals is obtained.

* * * * *